United States Patent
Fiala et al.

(10) Patent No.: US 9,323,929 B2
(45) Date of Patent: Apr. 26, 2016

(54) PRE-IDENTIFYING PROBABLE MALICIOUS ROOTKIT BEHAVIOR USING BEHAVIORAL CONTRACTS

(71) Applicant: QUALCOMM Incorporated, San Diego, CA (US)

(72) Inventors: David Fiala, Raleigh, NC (US); Mihai Christodorescu, San Jose, CA (US); Vinay Sridhara, Santa Clara, CA (US); Rajarshi Gupta, Sunnyvale, CA (US); Kassem Fawaz, Ann Arbor, MI (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/090,200

(22) Filed: Nov. 26, 2013

(65) Prior Publication Data

US 2015/0150130 A1    May 28, 2015

(51) Int. Cl.
*G06F 21/56* (2013.01)

(52) U.S. Cl.
CPC .............. *G06F 21/56* (2013.01); *G06F 21/566* (2013.01)

(58) Field of Classification Search
CPC ..... G06F 21/56; G06F 21/566; G06F 21/629; G06F 21/55; G06F 21/577; H04L 63/145; H04L 63/1433; H04L 63/1408
USPC ........................ 726/1–4, 17, 21–30
See application file for complete search history.

(56) References Cited

U.S. PATENT DOCUMENTS 7,770,785 B2    8/2010    Jha et al.
8,239,915 B1    8/2012    Satish et al.
8,726,388 B2 *  5/2014    Turbin ................. G06F 21/566
                                                      726/24
8,782,607 B2 *  7/2014    Andersen ............ G06F 11/0793
                                                      717/101

(Continued)

FOREIGN PATENT DOCUMENTS

WO    2012135192 A2    10/2012

OTHER PUBLICATIONS

Riley R., et al., "Guest-Transparent Prevention of Kernel Rootkits with VMM-based Memory Shadowing," RAID '08 Proceedings of the 11th international symposium on Recent Advances in Intrusion Detection, 2008, pp. 1-20.

(Continued)

*Primary Examiner* — Shanto M Abedin
(74) *Attorney, Agent, or Firm* — The Marbury Law Group, PLLC

(57) ABSTRACT

The various aspects provide for a computing device and methods implemented by the device to ensure that an application executing on the device and seeking root access will not cause malicious behavior while after receiving root access. Before giving the application root access, the computing device may identify operations the application intends to execute while having root access, determine whether executing the operations will cause malicious behavior by simulating execution of the operations, and pre-approve those operations after determining that executing those operations will not result in malicious behavior. Further, after giving the application root access, the computing device may only allow the application to perform pre-approved operations by quickly checking the application's pending operations against the pre-approved operations before allowing the application to perform those operations. Thus, the various aspects may ensure that an application receives root access without compromising the performance or security integrity of the computing device.

20 Claims, 11 Drawing Sheets

(56) References Cited

U.S. PATENT DOCUMENTS

| | | | |
|---|---|---|---|
| 2006/0090192 A1* | 4/2006 | Corby ................... G06F 21/51 726/1 |
| 2006/0174344 A1* | 8/2006 | Costea ................. G06F 21/564 726/24 |
| 2007/0022287 A1* | 1/2007 | Beck .................... G06F 21/554 713/164 |
| 2007/0079375 A1 | 4/2007 | Copley |
| 2008/0209316 A1* | 8/2008 | Zandstra ....................... 715/700 |
| 2009/0327179 A1* | 12/2009 | Strassner et al. ................ 706/14 |
| 2010/0218169 A1* | 8/2010 | Andersen et al. ............ 717/125 |
| 2011/0078509 A1* | 3/2011 | Wolf et al. .................. 714/38.1 |
| 2011/0145920 A1 | 6/2011 | Mahaffey et al. |
| 2011/0219440 A1* | 9/2011 | Allen ............................... 726/9 |
| 2012/0151557 A1* | 6/2012 | Ahmed et al. .................... 726/2 |
| 2012/0210423 A1 | 8/2012 | Friedrichs et al. |
| 2012/0297486 A1* | 11/2012 | Turbin ................. G06F 21/552 726/24 |
| 2013/0042294 A1* | 2/2013 | Colvin et al. ..................... 726/1 |
| 2013/0067531 A1* | 3/2013 | Morris et al. ..................... 726/1 |
| 2013/0097660 A1* | 4/2013 | Das ........................ H04L 63/10 726/1 |
| 2013/0097706 A1 | 4/2013 | Titonis et al. |
| 2013/0347096 A1* | 12/2013 | Lee ................................. 726/17 |
| 2014/0068422 A1* | 3/2014 | Rajkumar ..................... 715/243 |
| 2014/0245461 A1* | 8/2014 | O'Neill et al. ................. 726/28 |
| 2014/0366143 A1* | 12/2014 | Sandler ................ G06F 21/577 726/25 |
| 2015/0040224 A1* | 2/2015 | Litva .................... G06F 21/554 726/23 |
| 2015/0089645 A1* | 3/2015 | Vandergeest ........... G06F 21/55 726/23 |

OTHER PUBLICATIONS

Flatley B.N, "Rootkit Detection Using a Cross-View Clean Boot Method", Mar. 31, 2013, XP055170414, Retrieved from the Internet URL:http://www.dtic.mil/get-tr-doc/pdf?AD=ADA582225 [retrieved on Feb. 18, 2015] p. 1-p. 47.

International Search Report and Written Opinion—PCT/US2014/065528—ISA/EPO—Mar. 6, 2015.

Shabtai A., et al.,"Google Android: A State-of-the-Art Review of Security Mechanisms", Dec. 27, 2009, XP055153137, Retrieved from the Internet: URL:http://arxiv.org/abs/0912.5101 p. 1-p. 38.

\* cited by examiner

PRE-IDENTIFYING PROBABLE MALICIOUS ROOTKIT BEHAVIOR USING BEHAVIORAL CONTRACTS

BACKGROUND

Generally, the performance and power efficiency of a computing device degrade over time. Anti-virus companies (e.g., McAfee, Symantec, etc.) now sell mobile anti-virus, firewall, and encryption products that aim to slow this degradation. However, many of these solutions rely on the periodic execution of a computationally-intensive scanning engine on the computing device, which may consume many of the computing device's processing and battery resources, slow or render the computing device useless for extended periods of time, and/or otherwise degrade the user experience. In addition, these solutions are typically limited to detecting known viruses and malware, and do not address the multiple complex factors and/or the interactions that often combine to contribute to a computing device's degradation over time (e.g., when the performance degradation is not caused by viruses or malware). For these and other reasons, existing anti-virus, firewall, and encryption products do not provide adequate solutions for identifying the numerous factors that may contribute to a computing device's degradation over time or for preventing computing device degradation.

SUMMARY

The various aspects provide for a computing device and methods implemented by the device to ensure that an application executing on the device and seeking root access will not cause malicious behavior after receiving root access. In various aspects, before giving the application root access, the computing device processor may require the application to identify operations that the application intends to execute while having root access, determine whether executing the identified operations will cause malicious behavior by simulating or calculating the execution of the operations, and pre-approve those operations, but no others, after determining that executing those operations will not result in malicious behavior. After giving the application root access, the processor may only allow the application to perform pre-approved operations by quickly checking the application's pending operations against the pre-approved operations before allowing those operations to be executed. Thus, the various aspects may ensure that an application receives root access without compromising the performance or security integrity of the computing device.

In an aspect, the computing device may include a behavior analyzer unit that continually updates the computing device's behavior vector (i.e., a number vector describing the current configuration/state of the computing device) during the application's operation. The computing device may also include a contracts negotiator unit and a contracts enforcer unit that work together with or as part of the behavior analyzer unit to prevent an application from using root commands for malicious purposes.

In an aspect, an application executing on the computing device attempting to receive root access may be required to first provide or propose a "contract" of root access operations to the contracts negotiator unit. The contracts negotiator unit may determine whether executing the operations in the proposed contract would or could cause malicious behavior to occur on the computing device. This determination may be accomplished by determining whether any of the proposed actions would put the computing device's current behavior vector into a malicious configuration. The contracts negotiator unit may "accept" a proposed contract when it determines that the proposed root access operations would not cause or lead to malicious behavior. When the contracts negotiator unit accepts a proposed contract, the contracts negotiator unit may enable the application to perform the root access operations listed in the contract, and may signal a contracts enforcer unit to begin monitoring the application's operations against the approved contract.

In an aspect, after receiving an accepted contract for an application, the contracts enforcer unit may validate that the application's pending actions/operations are included in the accepted contract. The contracts enforcer unit may check each of the application's actions against the accepted contract before the each operation is performed, thereby ensuring that the application cannot perform unauthorized operations while operating as a root/super user. When the contracts enforcer unit recognizes that the application is about to perform an operation not included in the contract, the contracts enforcer unit may prevent the application from executing, such as by blocking the application or causing the application to terminate.

In another aspect, the application may attempt to amend a previously accepted contract by proposing to the contracts negotiator unit one or more amendments to the contract, such as additional root access operations. When this happens, the contractor negotiator unit may analyze the proposed amended contract and accept the amended contract if it determines that executing the operations in the amended contract would not result in malicious behavior. The contracts negotiator unit may send the amended contract to the contracts enforcer unit, which may begin enforcing the amended contract, effectively replacing the previously approved contract.

The various aspects may include a method of pre-identifying probable malicious rootkit behavior before it occurs in a computing device by receiving from an application attempting to obtain root access a proposed contract including a set of operations to be performed by the application that require or involve root access, determining whether executing the set of operations in the proposed contract would result in malicious behavior, preventing the application from executing, such as by blocking or terminating the application, in response to determining that at least one operation in the proposed contract would result in malicious behavior, accepting the proposed contract in response to determining that the set of operations in the proposed contract would not result in malicious behavior, and enforcing the accepted contract by enabling execution of operations in the accepted contract and preventing execution of operations not in the accepted contract. In an aspect, receiving from an application attempting to obtain root access a proposed contract may include receiving the proposed contract from the application before the application attempts to obtain root access, the proposed contract including a subset of operations that the application intends to perform. In an aspect, determining whether executing the set of operations in the proposed contract would result in malicious behavior may include determining a current configuration of the computing device, applying the set of operations in the proposed contract to the current configuration of the computing device, and determining whether applying the set of operations to the current configuration of the computing device results in malicious behavior. In an aspect, accepting the proposed contract in response to determining that the set of operations in the proposed contract would not result in malicious behavior may include accepting the proposed contract in response to determining that applying the set of operations to the current configuration of the computing device does not result in malicious behavior.

In an aspect, the method may also include receiving an amended contract from the application to replace a previously accepted contract, determining a current configuration of the computing device, determining an operation that the application last performed in the previously accepted contract, applying an amended set of operations included in the amended contract to the current configuration of the computing device starting from the last performed operation, determining whether applying the amended set of operations to the current configuration of the computing device would result in malicious behavior, rejecting the amended contract and preventing the application from executing, such as by terminating or blocking the application, in response to determining that applying at least one operation in the amended set of operations to the current configuration of the computing device would result in malicious behavior, accepting the amended contract in response to determining that applying the amended set of operations to the current configuration of the computing device would not result in malicious behavior, and replacing the previously accepted contract with the accepted amended contract.

In an aspect, enforcing the accepted contract by enabling execution of operations in the accepted contract and preventing execution of operations not in the accepted contract may include identifying a pending operation that the application will perform next, determining whether the pending operation matches one of the set of operations in the accepted contract, enabling the application to perform the pending operation in response to determining that the pending operation matches one of the set of operations in the accepted contract, and preventing the application from executing, such as by blocking or terminating the application, in response to determining that the pending operation does not match one of the set of operations in the accepted contract. In an aspect, the method may also include determining whether the application will perform the pending operation in an order of operations in the accepted contract in response to determining that the pending operation matches one of the set of operations in the accepted contract, enabling the application to perform the pending operation in response to determining that the application will perform the pending operation in the order of operations in the accepted contract, and preventing the application from executing, such as by blocking or terminating the application, in response to determining that the application will perform the pending operation out of the order of operations in the accepted contract. In an aspect, the method may also include determining whether the pending operation is included in a pre-approved list of operations in response to determining that the pending operation does not match one of the set of operations in the accepted contract, enabling the application to perform the pending operation in response to determining that the pending operation is included in the pre-approved list of operations, and preventing the application from executing, such as by blocking or terminating the application, in response to determining that the pending operation is not included in the pre-approved list of operations.

Further aspects include a computing device that includes a memory, and a processor coupled to the memory and configured to perform operations of the methods described above.

Further aspects include a computing device including means for performing functions of the methods described above.

Further aspects include a non-transitory processor-readable storage medium having stored thereon processor-executable instructions configured to cause a computing device processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
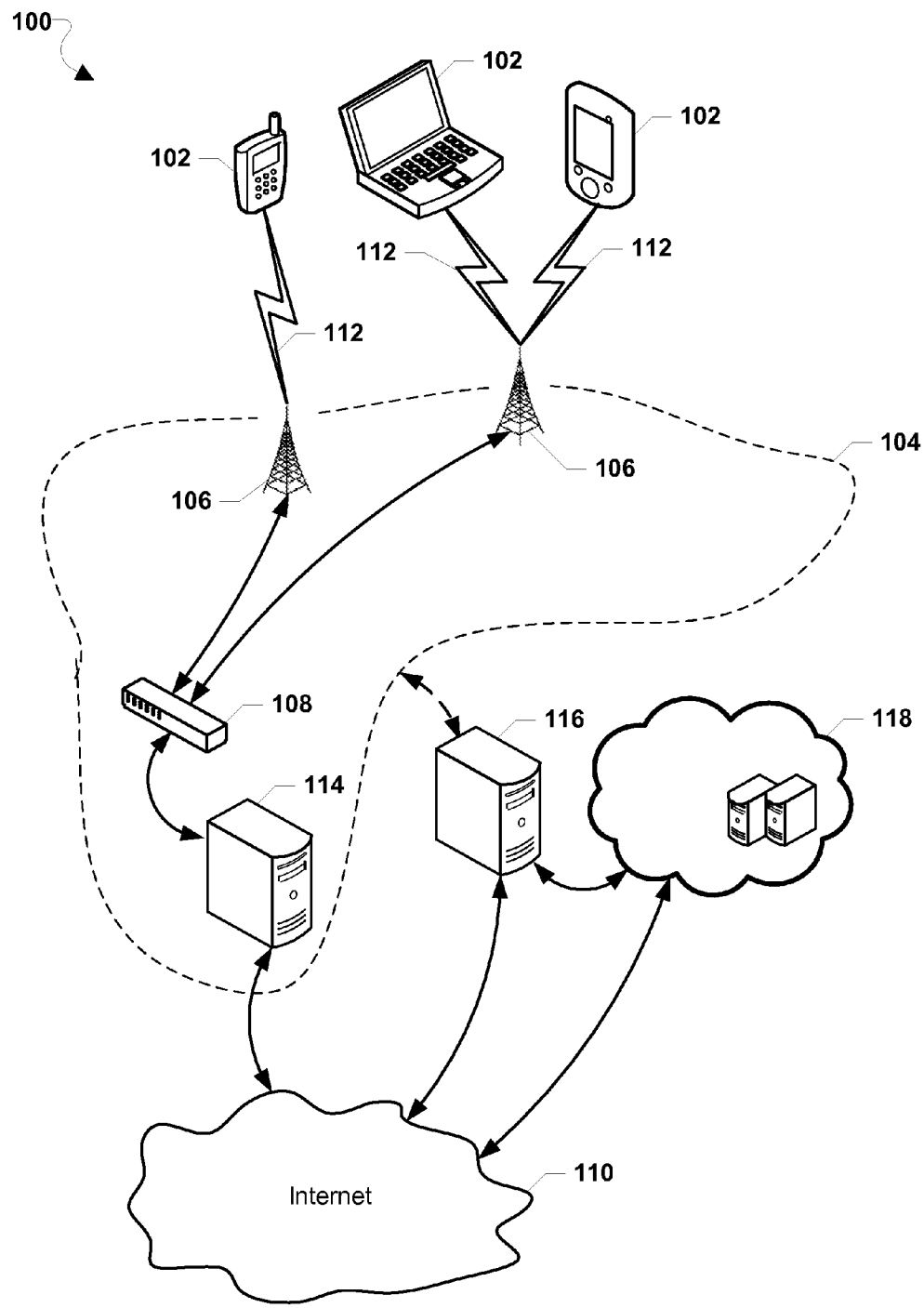
FIG. 1 is a communication system block diagram illustrating network components of an example communication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "computing device" as used herein refers to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory and a programmable processor. While the various aspects are particularly useful for mobile computing devices, such as smartphones, which have limited resources, the aspects are generally useful in any electronic device that includes a processor and executes application programs.

The term "malicious behavior" is used herein to refer to a wide variety of undesirable computing device operations and characteristics, such as longer processing times, lower battery life, loss of private data, malicious economic activity (e.g., sending unauthorized premium SMS message), operations relating to commandeering the computing device or utilizing the phone for spying or botnet activities, etc.

The term "malicious configuration" is used herein to refer to a configuration of a computing device, application, process, etc. that exhibits or performs malicious behavior.

There are a variety of factors that may contribute to the degradation in performance and power utilization levels of a computing device over time, including poorly designed software applications, malware, viruses, fragmented memory, background processes, and other malicious behavior. However, due to the complexity of modern computing devices, it is increasingly difficult for users, operating systems, and/or application programs (e.g., anti-virus software, etc.) to accurately and efficiently identify the sources of such problems and/or to provide adequate remedies to identified problems.

Various solutions currently exist for detecting malicious behavior on a computing device. Many solutions have traditionally relied on a signature database of malicious code/malware built on a server. These solutions require referencing a signature database to detect whether code is malicious based on the identity (i.e., signature) of the code, such as the name of a file, the name of a function call, the structure of a particular code segment, and even the signature of each byte of code. However, these solutions are inadequate to detect malicious behavior that may be undetectable until the code is executed and are increasingly ineffective as a result of new techniques of forging signatures. In contrast, the various aspects described below enable a computing device to detect malicious behavior during normal operations (i.e., in real time) and prevent such malicious behavior from occurring in the future, regardless of any particular identity or signature.

Additionally, some solutions look for signs of malicious behavior in code, files, scripts, etc. before they are executed by initiating preemptive scans or by using static lists of pre-approved operations. For instance, a solution may require that an application have certain predefined traits (e.g., a particular checksum) that have previously been verified to be benign. However, because applications must have these predefined characteristics, current solutions may be unable to determine whether operations in new or previously unencountered programs pose a threat and, thus, may unnecessarily prevent them from executing.

In contrast to conventional approaches, the various aspects described below enable an application to propose a list of operations it intends to perform, and the computing device may verify that those operations would not cause malicious behavior when executed and may ensure that the application only performs those pre-approved operations. Thus, rather than requiring the application's operations to fit within predefined and static lists of allowed operations, the various aspects provide a comparatively flexible approach to preventing malicious behavior on the computing device.

Other solutions use behavioral models to differentiate between malicious and benign process/programs on computing devices. However, these solutions are currently limited to evaluating the current/on-going behavior of individual application programs or processes and thus are also limited to resolving problems only after they have already begun. However, these strategies' effectiveness may be compromised by a malicious application that receives heightened security privileges (sometimes referred to herein as "root access" or "super user access") because a malicious application may leverage its root access to execute instructions to hinder, pause, or even terminate mechanisms configured to detect such malicious behavior, thereby leaving the computing device vulnerable to attack and/or performance degradation.

In overview, the various aspects address this potential vulnerability by providing for a computing device and methods implemented by the device to ensure that an application executing on the device and seeking root access will not cause malicious behavior after receiving root access. In various aspects, before giving the application root access, the computing device processor may require the application to identify operations that the application intends to execute while having root access, determine whether executing the identified operations will cause malicious behavior by simulating or calculating the execution of the operations, and pre-approve those operations, but no others, after determining that executing those operations will not result in malicious behavior. Further, after giving the application root access, the processor may only allow the application to perform pre-approved operations by quickly checking the application's pending operations against the pre-approved operations before allowing those operations to be executed. Thus, the various aspects may ensure that an application receives root access without compromising the performance or security integrity of the computing device.

In an aspect, the computing device may include a behavior analyzer unit that continually updates the computing device's behavior vector (i.e., a number vector describing the current configuration/state of the computing device) during the application's operation. In further aspects, the computing device may also include a contracts negotiator unit and a contracts enforcer unit that work together with or as part of the behavior analyzer unit to prevent an application from using root commands for malicious purposes as further described below.

In an aspect, an application executing on the computing device attempting to receive root access may be required to first provide or propose a "contract" of root access operations to the contracts negotiator unit. Such a contract may include a list of proposed actions, processes, system calls, function calls, etc. that the application intends to perform that will require having root access. The contracts negotiator unit may determine whether executing the operations in the proposed contract would or could cause malicious behavior to occur on the computing device. This determination may be accomplished by determining whether any of the proposed actions would put the computing device's current behavior vector into a malicious configuration. The contracts negotiator unit may "accept" a proposed contract when it determines that the proposed root access operations would not cause or lead to malicious behavior. When the contracts negotiator unit accepts a proposed contract, the contracts negotiator unit may enable the application to perform the root access operations listed in the contract, and may signal a contracts enforcer unit to begin monitoring the application's operations against the approved contract.

In an aspect, after receiving an accepted contract for an application, the contracts enforcer unit may validate that the application's pending actions/operations are included in the accepted contract. The contracts enforcer unit may check each of the application's actions against the accepted contract before the each operation is performed, thereby ensuring that the application cannot perform unauthorized operations while operating as a root/super user. When the contracts enforcer unit recognizes that the application is about to perform an operation not included in the contract, the contracts enforcer unit may prevent the application from executing, such as by blocking the application or causing the application to terminate. In an aspect, when an application is blocked, more time may be allowed to enable the application to renegotiate the contract. Because this check by the contracts enforcer unit involves a simple table look up or comparison to a list in memory and a binary decision (allow or block), this checking operation can be accomplished very quickly and with minimal overhead, thus enabling root access protections to be implemented with minimal impact on the computing device's performance.

In an aspect, the application may attempt to amend a previously accepted contract by proposing to the contracts negotiator unit one or more amendments to the previously accepted contract, such as additional root access operations. For example, the application may wait until one path in a conditional branch is selected during runtime before asking the contracts negotiator unit for permission to perform root access operations in that selected branch. When this happens, the contractor negotiator unit may analyze the proposed amended contract and accept the amended contract if it determines that executing the operations in the amended contract would not put the computing device's behavior vector into a malicious configuration/state. The contracts negotiator unit may send the amended contract to the contracts enforcer unit, which may begin enforcing the amended contract, effectively replacing the previously approved contract.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between computing devices 102 (e.g., cell phones, laptops, tablets, etc.) and other network destinations, such as via telephone land lines (e.g., a POTS network, not shown) and the Internet 110. Communications between the computing devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the computing devices 102 may be achieved through the telephone network 104, the internet 110, private network (not illustrated), or any combination thereof.

The computing devices 102 may collect behavioral, state, classification, modeling, success rate, and/or statistical information in the computing device 102, and send the collected information to the network server 116 (e.g., via the telephone network 104) for analysis. In an aspect, the computing devices 102 may send their current configuration information (e.g., their behavioral vectors describing their current state) after experiencing malicious behavior. The computing device 102 may also send their configuration histories to the network server 116. The configuration histories may include a history of configuration changes that occurred leading up to the discovery of malicious behavior and, optionally, the instructions that caused those configuration changes.

In an aspect, the network server 116 may be configured to receive a large amount of information from a cloud service/network 118, and generate a full or robust data/behavior model (i.e., a large classifier model) that includes all or most of the features, data points, and/or factors that could contribute to the computing device's degradation over time. The network server 116 may also send the large classifier model to the computing device 102 for use in generating a lean classifier model as described below.

Figure 2:
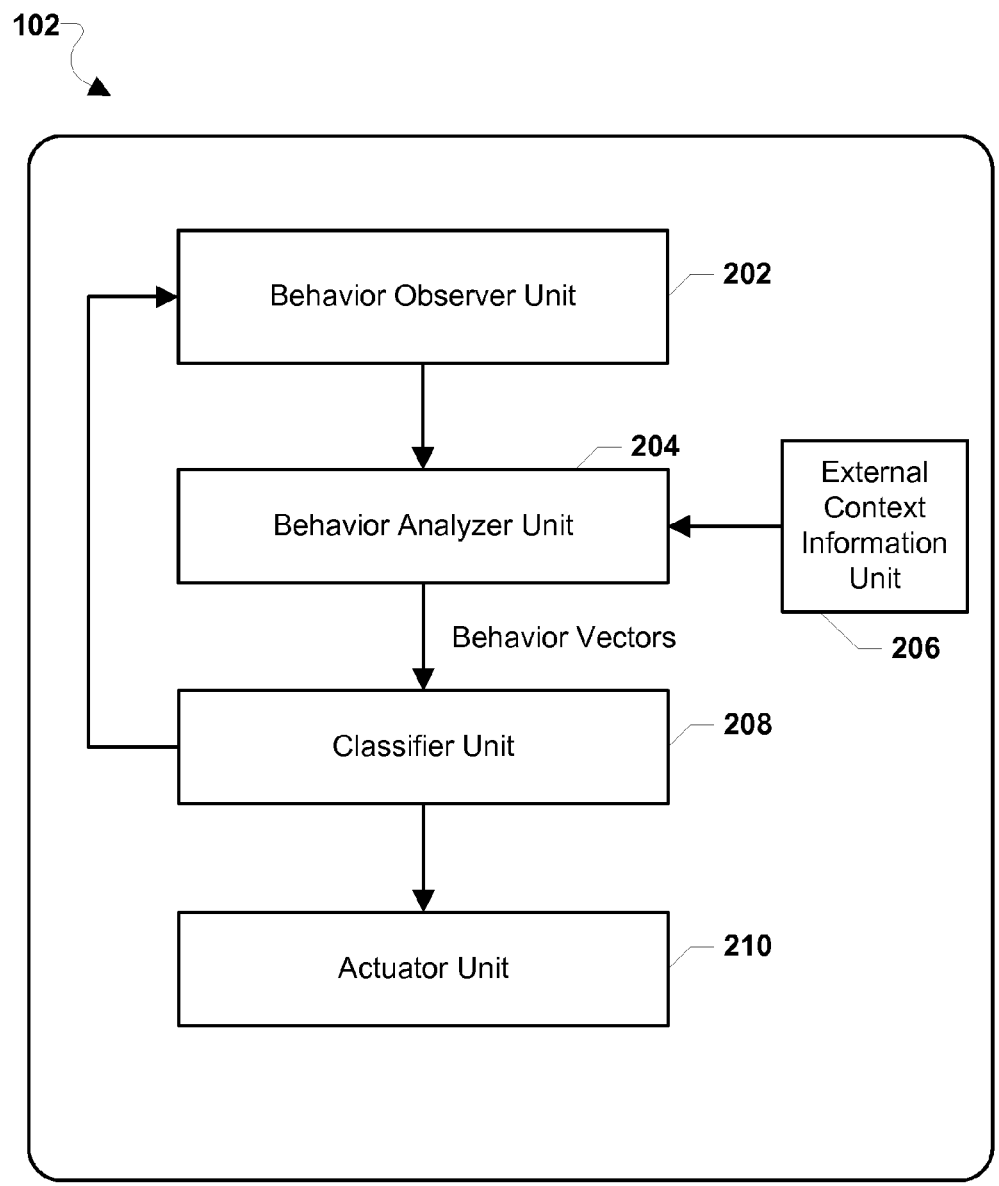
FIG. 2 is a functional block diagram illustrating example logical components and information flows in an aspect computing device configured to determine whether a particular computing device behavior, software application, or process is performance-degrading, suspicious, or benign.

FIG. 2 illustrates example logical components and information flows in an aspect computing device 102 configured to determine whether a particular computing device behavior, software application, or process is malicious, suspicious, or benign. In the example illustrated in FIG. 2A, the computing device 102 may include a behavior observer unit 202, a behavior analyzer unit 204, an external context information unit 206, a classifier unit 208, and an actuator unit 210. In an aspect, the classifier unit 208 may be implemented as part of the behavior analyzer unit 204. In an aspect, the behavior analyzer unit 204 may be configured to generate one or more classifier units 208, each of which may include one or more classifiers.

Each of the units 202-210 may be implemented in software, hardware, or any combination thereof. In various aspects, the units 202-210 may be implemented within parts of the operating system (e.g., within the kernel, in the kernel space, in the user space, etc.), within separate programs or applications, in specialized hardware buffers or processors, or any combination thereof. In an aspect, one or more of the units 202-210 may be implemented as software instructions executing on one or more processors of the computing device 102.

The behavior observer unit 202 may be configured to instrument or coordinate application programming interfaces (APIs) at various levels/units of the computing device, and monitor/observe computing device operations and events (e.g., system events, state changes, etc.) at the various levels/units via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204.

The behavior observer unit 202 may monitor/observe computing device operations and events by collecting information pertaining to library API calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the computing device.

The behavior observer unit 202 may also monitor/observe one or more hardware counters that denote the state or status of the computing device and/or computing device sub-systems. A hardware counter may include a special-purpose register of the processors/cores that is configured to store a count or state of hardware-related activities or events occurring in the computing device.

The behavior observer unit 202 may also monitor/observe actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer unit 202 may monitor/observe transmissions or communications of the computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the computing device before establishing radio communication links or transmitting information, dual/multiple SIM cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the computing device. For example, the computing device processor may be configured to determine whether the phone is in a holster (e.g., via a magnet sensor configured to sense a magnet within the holster) or in the user's pocket (e.g., via the amount of light detected by a camera or light sensor). Detecting that the computing device is in a holster may be relevant to recognizing malicious behaviors, for example, because activities and functions related to active usage by a user (e.g., taking photographs or videos, sending messages, conducting a voice call, recording sounds, etc.) occurring while the computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a USB power charging source, detecting that a keyboard or auxiliary device has been coupled to the computing device, detecting that the computing device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the computing device, etc.

To reduce the number of factors monitored to a manageable level, in an aspect, the behavior observer unit 202 may perform coarse observations by monitoring/observing an initial set of behaviors or factors that are a small subset of all factors that could contribute to the computing device's degradation. In an aspect, the behavior observer unit 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

In another aspect, the behavior observer unit 202 may observe behaviors/features specified in a lean classifier model generated by the behavior analyzer unit 204 and/or the classifier unit 208. The lean classifier model may include a subset of features included in the large classifier model received from a network server (e.g., network server 116) as described above with reference to FIG. 1, and the lean classifier model may include information from the large classifier model determined to have the highest probably of enabling the classifier unit 208 to conclusively determine whether a particular computing device behavior is benign or malicious/performance-degrading.

The behavior analyzer unit 204 and/or classifier unit 208 may receive the observations from the behavior observer unit 202, compare the received information (i.e., observations) with contextual information received from the external context information unit 206, and identify subsystems, processes, and/or applications associated with the received observations that are contributing to (or are likely to contribute to) the device's degradation over time, or which may otherwise cause problems on the device (e.g., malicious behavior).

In an aspect, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external context information unit 206, etc.), learn the normal operational behaviors of the computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior models (e.g., a generated lean classifier model) to determine whether a particular computing device behavior, software application, or process is malicious, benign, or suspicious.

When the classifier unit 208 determines that a behavior, software application, or process is malicious, the classifier unit 208 may notify the actuator unit 210, which may perform various actions or operations to correct computing device behaviors determined to be malicious or performance-degrading and/or perform operations to heal, cure, isolate, or otherwise fix the identified problem.

Figure 3:
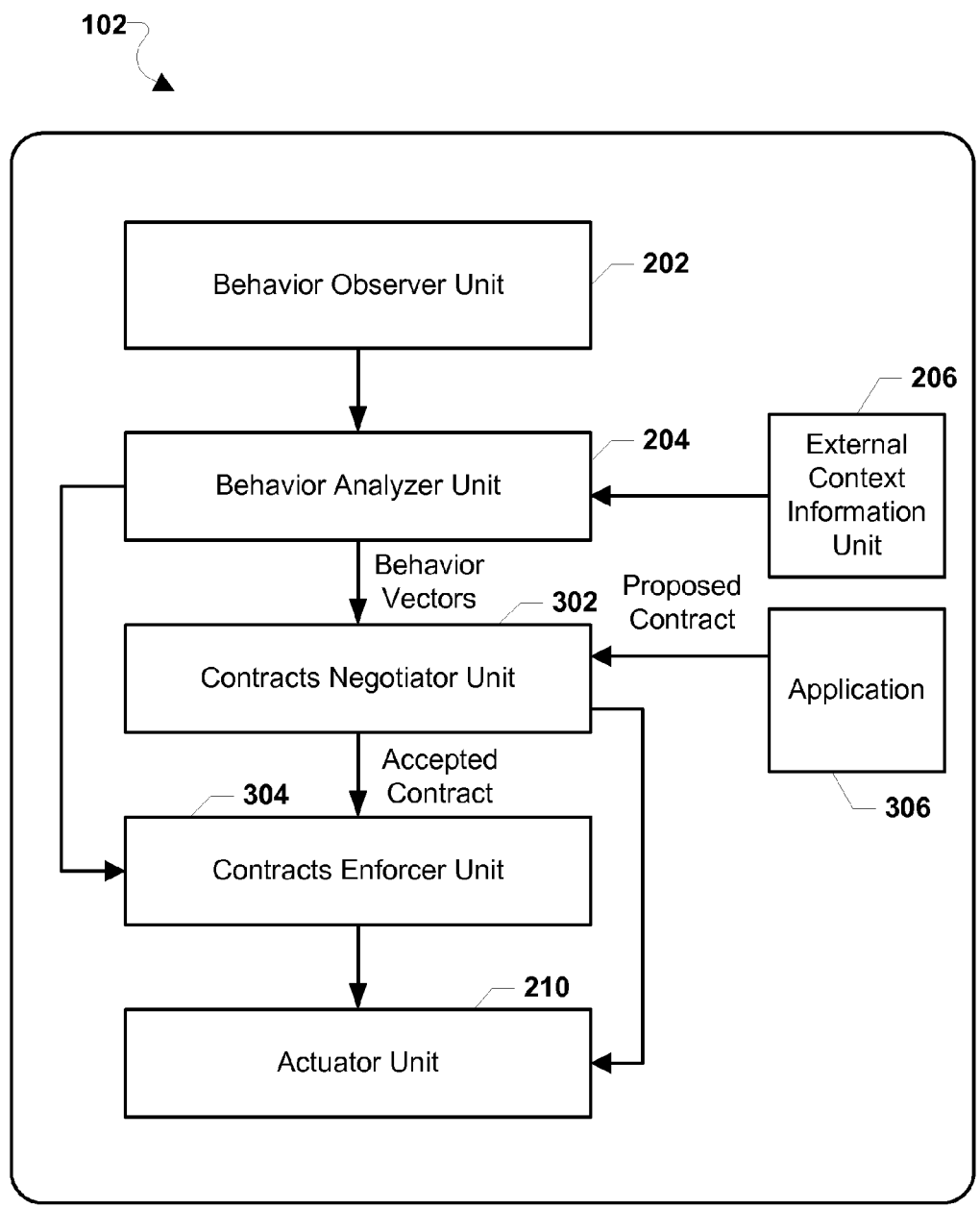
FIG. 3 is a functional block diagram illustrating example logical components and information flows in an aspect computing device configured to determine whether to accept a proposed contract received from an application and configured to enforce accepted contracts.

FIG. 3 illustrates example logical components and information flows in an aspect computing device configured to enable an application to receive root access while ensuring that the application does not cause malicious behavior on the computing device.

In an aspect, a computing device 102 may include units 202-210 as described above with reference to FIG. 2. The computing device 102 may also include a contracts negotiator unit 302, a contracts enforcer unit 304, and one or more applications 306. In an aspect (not shown), the contracts negotiator unit 302 and/or the contracts enforcer unit 304 may be implemented as part of the behavior analyzer unit 204.

In an aspect, an application 306 may execute on a processor of the computing device 102 on top of an operating system (not shown) or as a standalone process. During the application 306's execution, the application 306 may need to perform one or more privileged operations that require root/super-user access. For example, the application 306 may need to perform various system calls, root commands, etc. As mentioned above, after receiving root access, a malicious application 306 might be able to frustrate or disable the computing device 102's ability to detect and terminate malicious behavior. Therefore, to enable the application to perform benign or otherwise legitimate operations while preventing malicious root access operations, the contracts negotiator unit 302 may analyze a list of root access operations that the application intends to perform as a root/super user in a "proposed contract," and authorize the application 306 to perform root access operations that would not cause malicious behavior by approving benign operations in a contract.

The application 306 may generate the proposed contract, which may outline the intended APIs, operations, function calls, system calls, etc. that the application will perform that require/involve root access or that will be performed while having root access. The proposed contract may be limited to just those tasks, APIs, operations, function calls, system calls, etc. that require root access, and thus the contract typically will be limited to a small percentage of an applications operations. In an aspect, the proposed contract may include one or more operations, and each application may generate a unique proposed contract that reflects the operations or functions particular to that application. For example, an application that may operate on a server that has an expected execution time of several days or weeks may generate a relatively complex proposed contract that may include thousands of operations to be performed while the application has root access. On the other hand, an application configured to operate on a smartphone may require root access to perform a very small percentage of its operations, and thus may generate a simple proposed contract that includes a few dozen operations. In an aspect, the proposed contract may only include a subset of the application 306's full set of operations (i.e., a subset of operations), and the proposed contract may only include the operations the application 306 anticipates performing within a definable time or along a predictable progression of its operations. Again, the proposed contract may be an amendment to a previously accepted contract as is described below with reference to FIG. 9.

The proposed contract may also include the parameters, arguments, or other data associated with the operations included in the proposed contract. For example, the proposed contract may include a function call (e.g., "open( )") as well as the parameter used with that function call (e.g., "open (file.txt)"). In another aspect, the application 306 may populate the proposed contract with operations in the order in which they application 306 will perform those operations. The composition of a proposed contract is further described below in examples of aspect proposed contracts illustrated in FIGS. 4A and 4B In response to receiving a proposed contract, the contracts negotiator unit 302 may simulate execution of or calculate the operations included in the proposed contract to identify the future configurations of the computing device 102 that would or could occur as a result of executing the operations in the proposed contract given the current configuration of the computing device 102. In an aspect, the contracts negotiator unit 302 may request one or more behavior vectors from the behavior analyzer unit 204 that characterize the computing device 102's current configuration/state and may simulate the effects of performing the operations in the proposed contract on the one or more behavior vectors. The contracts negotiator unit 302, either individually or as part of the behavior analyzer unit 204 and/or classifier unit 208, may check/classify the resulting behavior vectors to determine whether allowing the application 306 to perform the operations in the proposed contract would or could cause malicious behavior at any point during execution of the operations as described above.

The contracts enforcer unit 304 may receive proposed contracts that the contracts negotiator unit 302 has determined do not cause malicious behavior (i.e., "accepted contracts"), and the enforcer unit 304 may be configured to monitor the operations the application 306 is about to perform to make sure that those operations are included in the accepted contract. In other words, the contracts enforcer unit 304 may ensure that the application 306 upholds its promise to perform only the operations in the accepted contract. In an aspect, the contracts enforcer unit 304 may perform such enforcement operations based at least in part on information received from the behavior analyzer unit 204. In an aspect, the enforcer unit 304 may ensure that the application 306 performs operations in the accepted contract in the order in which they are listed in the accepted contract (i.e., an order of operations).

The actuator unit 210 may be configured to prevent the application 306 from executing in response to receiving a signal from the contracts negotiator unit that performing operations in the proposed contract causes (or may cause) malicious behavior (i.e., that the proposed contract has been rejected). For example, the application 306 may be prevented from executing by blocking or terminating the application. The actuator unit 210 may also block or terminate the application 306 in response to receiving a signal from the contracts enforcer unit 304 that the application 306 has attempted to perform an operation that is not included in the accepted contract and/or that the application 306 has attempted to perform an operation in the accepted contract out of order.

Figure 4A:
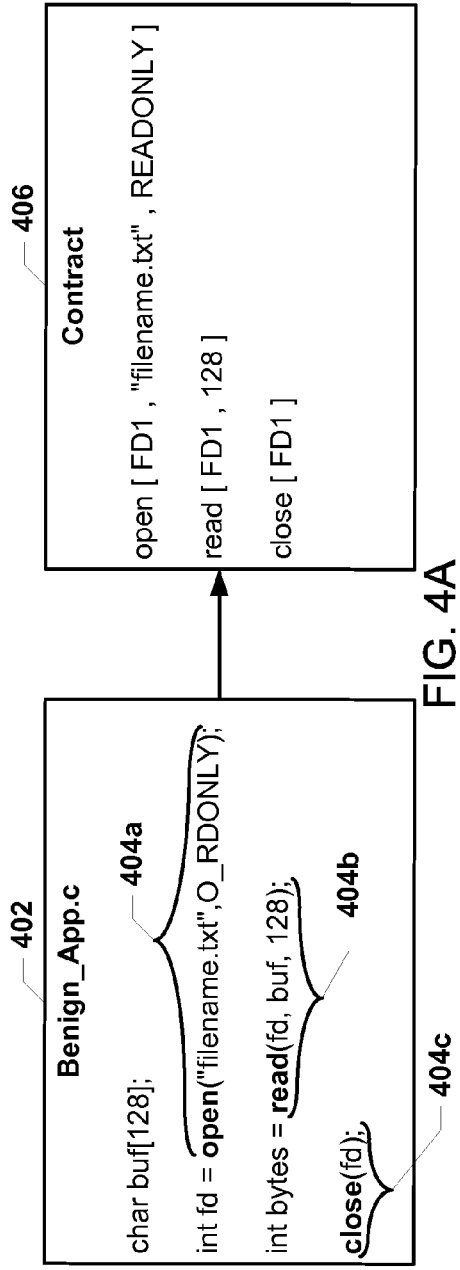
FIGS. 4A-4B are illustrations of example contracts generated by applications according to an aspect.
Figure 4B:
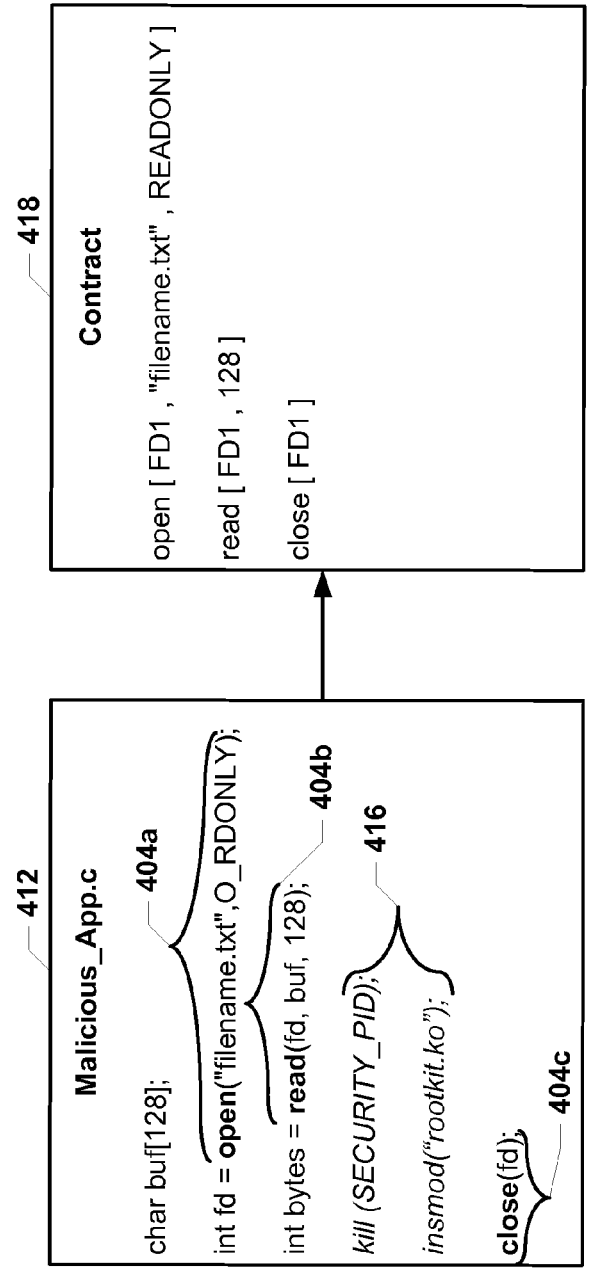

FIGS. 4A and 4B illustrate example proposed contracts 406, 418 proposed by applications 402, 412, respectively, according to an aspect. As described above, an application or process may desire or need root access to perform certain operations, but the application's unchecked root activities may be capable of disabling malware detection/prevention systems before the malware system can detect and terminate the application. In order to provide root access to an application while still maintaining the integrity of the computing device, a contracts negotiator unit must first receive and accept a contract that the application has generated, examples of which are illustrated below with reference to FIGS. 4A and 4B.

As illustrated in FIG. 4A, an application 402 ("Benign_App.c") may include various operations that the application intends to perform as a root/super user. For example, the application 402 may require root access to perform system calls to open a file (i.e., an open operation 404a), read part of the file (i.e., a read operation 404b), and close the file (i.e., a close operation 404c).

In an aspect, the application 402 may prepare a contract 406 that includes entries for the operations 404a-404c that the application 402 intends to perform while having root access. The contract 406 may include entries for the operations 404a-404c, as well as the parameters the operations may utilize during operations. As illustrated in the contract 406, the open operation 404a may include a file-handle parameter "FD1," a source parameter "filename.txt," and a modifier parameter "READONLY." The contract 406 may also list the operations 404a-404c in the order in which the application intends to perform them. Thus, as illustrated, an entry for the open operation 404a may be listed before entries for the read operation 404b and the close operation 404c.

After generating the proposed contract 406, the application 402 may send the proposed contract 406 to a contracts negotiator unit, and the negotiator unit may simulate the execution of the operations 404a-404c as described above with reference to FIG. 3 and may accept the proposed contract 406 after determining that performing the operations 404a-404c would not cause malicious behavior. The contracts negotiator unit may then send the accepted contract 406 to the contracts enforcer unit, and the enforcer unit may make sure that the application 402 only performs operations 404a-404c.

In another example illustrated in FIG. 4B, another application 412 (i.e., Malicious_App.c") may generate a contract 418 that includes entries for several benign operations 404a-404c as described above but may omit other operations 416 (e.g., malicious and/or benign operations) from the contract 418 the application 412 may also intend to perform. Assuming the contracts negotiator unit accepts the contract 418 after simulating execution of the operations in the contract 418, the negotiator unit may provide the application 412 with root access and may pass the contract 418 to the contracts enforcer unit for enforcement.

During enforcement of the contract 418, the contracts enforcer unit may quickly determine whether the operations the application 412 is about to perform are included in the contract 418 as described above with reference to FIG. 3. Thus, just before the application 412 attempts to perform the operations 416, the contracts enforcer unit may determine whether the operations 416 are included in the accepted contract 418 and/or prevent the application 412 from executing an operation not included in the accepted contract, such as by blocking the application or causing the application 412 to terminate, before the application 412 has an opportunity to execute any operations not in the contract.

Figure 5:
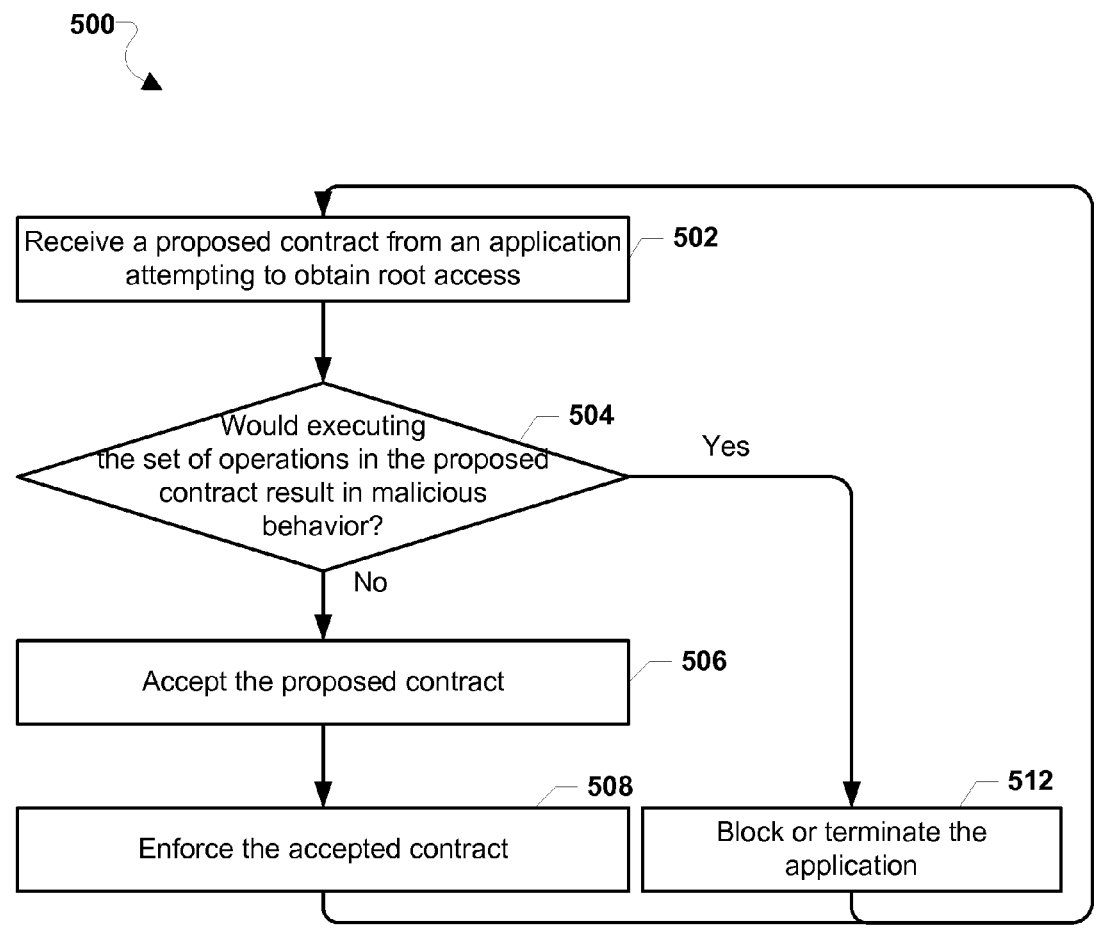
FIG. 5 is a process flow diagram illustrating an aspect method for accepting and enforcing a proposed contract received from an application.

FIG. 5 illustrates an aspect method 500 that may be implemented by one or more components operating on a processor of a computing device for accepting and enforcing a contract received from an application to prevent the application from causing malicious behavior while having root access.

As mentioned above, an application having root access has the potential to thwart efforts to detect and stop malicious behavior. To avoid this scenario, a contracts negotiator unit and contracts enforcer unit executing on the computing device processor may approve the application to receive root access and may supervise the operation of the application to ensure that the application does not attempt to cause malicious behavior as further described herein. Thus, by leveraging the benefits of using the contract system described below, the various aspects may ensure computing device security and integrity more efficiently than conventional methods of detecting malicious behavior by examining the effects of each of the application's operations on-the-fly.

In block 502, the contracts negotiator unit executing on the processor may receive a proposed contract from an application attempting to obtain root access. As described above with reference to FIG. 3, the proposed contract may include the list or set of operations, APIs, function calls, etc. that the application intends to perform while having root access. In an aspect, the contracts negotiator unit may receive the proposed contract just before the application attempts to obtain root access, and the application may operate normally until it needs to execute privileged, root commands.

In response to receiving the proposed contact, the processor executing the contracts negotiator unit may determine whether executing the set of operations in the proposed contract would result in malicious behavior in determination block 504. The operations of determination block 504 are further described below with reference to FIGS. 6 and 9.

When the processor executing the contracts negotiator unit determines that executing the set of operations in the proposed contract would result in malicious behavior (i.e., determination block 504="Yes"), the actuator unit executing on the processor may prevent the application from executing, such as by blocking or terminating the application, in block 512. In an aspect, the processor executing the actuator unit and/or the contracts negotiator unit may block the application from receiving root access by preventing the application from performing any operations as a root user. In such an aspect, the application may continue to perform other operations that do not require root/super-user access. In a further aspect, after being blocked, the application may engage in further negotiations with the contracts negotiator unit, such as by repeating the operations described above to propose another contract in an attempt to acquire root level privileges. In an alternative aspect, the actuator may enforce a "zero-tolerance" policy and may terminate rather than block the application, thereby foreclosing the possibility of further contract negotiations.

When the processor executing the contracts negotiator unit determines that executing the set of operations in the proposed contract would not result in malicious behavior (i.e., determination block 504="No"), the processor executing the contracts enforcer unit may accept the proposed contract in block 506, which may involve enabling the application to receive root access (e.g., providing the necessary root-access permissions and/or notifying other components or processes on the computing device to allow the application to perform as a root/super user). The processor executing the contracts negotiator unit may also send the accepted contract to the contracts enforcer unit, and in response, the processor executing the contracts enforcer unit may begin enforcing the accepted contract in block 508 and as further described below with reference to FIG. 7.

After either enforcing the accepted contract in block 508 or blocking/terminating the application in block 512, the processor executing the contracts negotiator unit may receive another proposed contract from an application in block 502.

Figure 6:
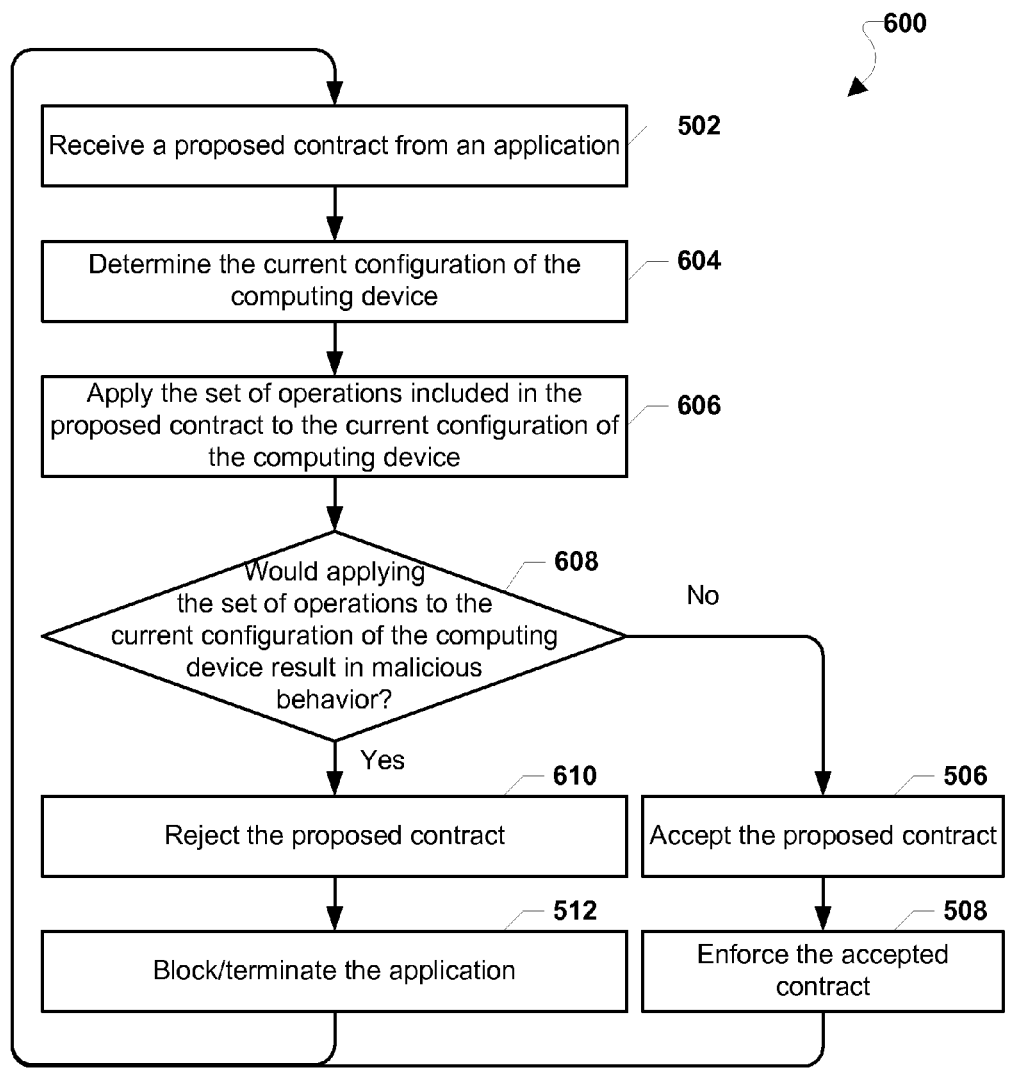
FIG. 6 is a process flow diagram illustrating an aspect method for determining whether to accept a proposed contract by applying the operations included in the proposed contract to the current configuration of the computing device.

FIG. 6 illustrates an aspect method 600 that may be implemented on a computing device processor for determining whether to accept a proposed contract received from an application. The operations of method 600 implement an aspect of the operations of method 500 described above with reference to FIG. 5.

The processor executing the contracts negotiator unit may receive a proposed contract from an application in block 502 as described above with reference to FIG. 5. In block 604, the processor executing the contracts negotiator unit may also determine the current configuration of the computing device. In an aspect, to determine the computing device's current configuration, the processor executing the contracts negotiator may obtain one or more behavior vectors describing the current configuration/state of the computing device, such as from a behavior analyzer unit.

The processor executing the contracts negotiator unit may also apply the operations included in the proposed contract to the current configuration of the computing device in block 606 by simulating or calculating the effects of performing those operations on the current configuration of the computing device. In an aspect, the processor executing the contracts negotiator unit (either separately or as part of the behavior analyzer unit and/or classifier unit as described above) may determine whether performing the operations in the proposed contract in order would cause the computing device to enter a malicious configuration at any point during the operations' execution. For example, the processor executing the contracts negotiator unit and/or a behavior analyzer unit may record how the one or more behavior vectors representing the current configuration of the computing device would change in response to executing the operations in the proposed contract. In another aspect, the processor executing the contracts negotiator unit may simulate the execution of each operation in the proposed contract in the order in which they are listed in the proposed contract.

The processor executing the contracts negotiator unit may also determine whether applying the set of operations to the current configuration of the computing device would result in malicious behavior in determination block 608. In an aspect, after simulating the execution of each operation in the proposed contract, the processor executing the contracts negotiator unit may classify the one or more behavior vectors representing the predicted future configurations of the computing device as benign or malicious as described above with reference to FIG. 2, thereby enabling the contracts negotiator unit to definitively identify any malicious behavior that would result from performing the operations included in the proposed contract.

When the processor executing the contracts negotiator unit determines that applying the set of operations to the current configuration of the computing device would not result in malicious behavior (i.e., determination block 608="No"), the processor executing the negotiator unit may accept the proposed application in block 506 as described above with reference to FIG. 5. The processor executing the contracts enforcer unit may then begin enforcing the accepted application in block 508 as described above with reference to FIG. 5. Also, the processor executing the contracts negotiator unit may repeat the operations described above starting in block 502 when the processor executing the contracts negotiator unit receives another proposed contract from an application When the processor executing the contracts negotiator unit determines that applying the set of operations to the current configuration of the computing device results in malicious behavior (i.e., determination block 608="Yes"), the processor executing the negotiator unit may reject the proposed contract in block 610, thereby denying the application from receiving root access. In an aspect, the processor executing the contracts negotiator unit may reject the contract in response to determining that at least one operation in the proposed contract would result in malicious behavior. The processor executing the contracts negotiator unit may signal the processor executing the actuator unit to prevent the application from executing, such as by blocking or terminating the application, in block 512 as described above. In an aspect, the processor executing the contracts negotiator unit may repeat the operations described above starting in block 502 when the processor executing the negotiator unit receives another proposed contract from an application.

Figure 7:
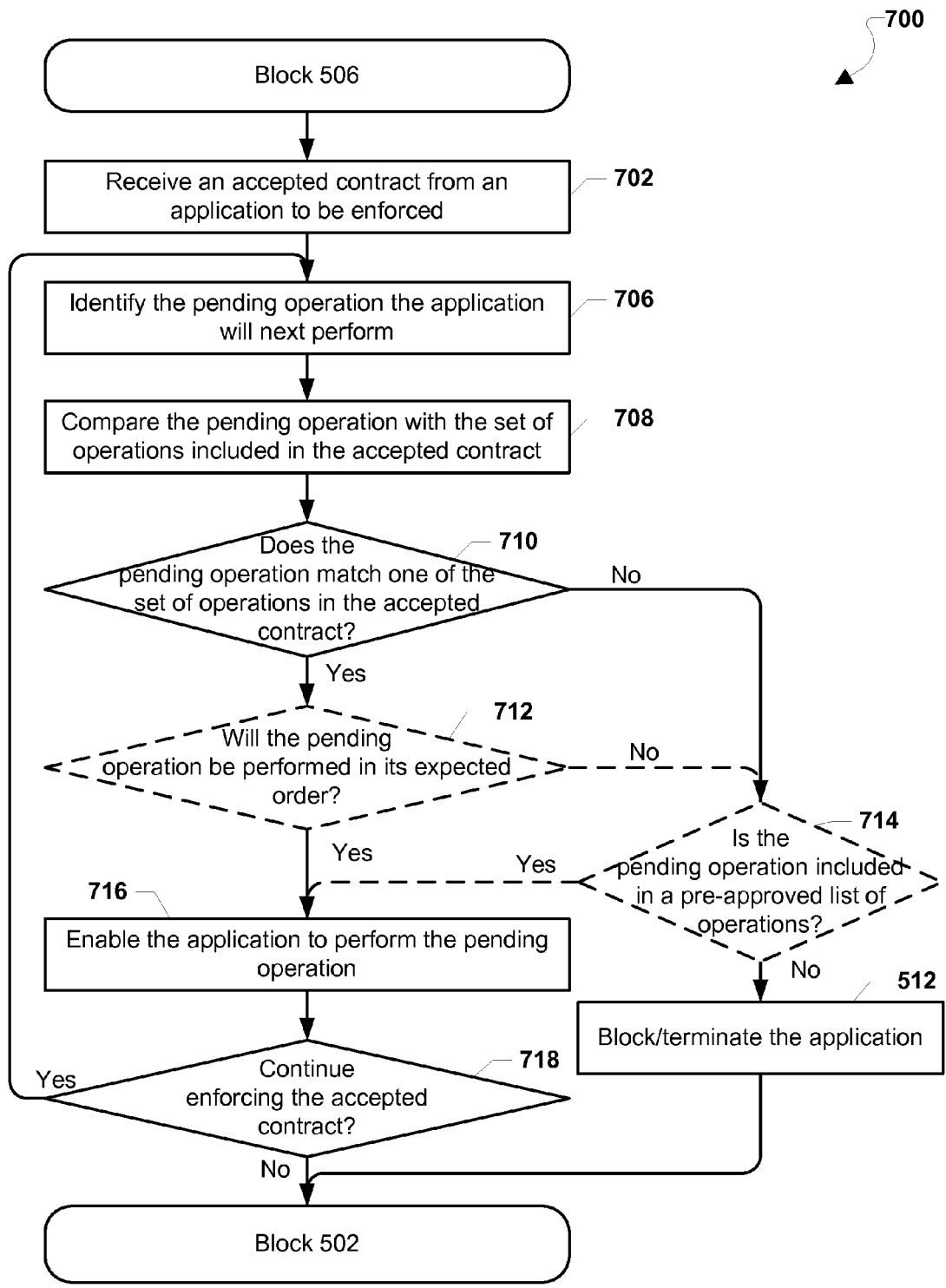
FIG. 7 is a process flow diagram illustrating an aspect method for enforcing an accepted contract.

FIG. 7 illustrates an aspect method 700 that may be implemented by processor(s) on a computing device for enforcing a previously accepted contract to ensure that an application with root access honors the accepted contract. The operations of method 700 implement an aspect of the operations of method 500 described above with reference to FIG. 5, and the operations may start after the processor executing the contracts negotiator unit accepts a contract in block 506 of method 500.

As described above, the processor executing the contracts negotiator unit may guard against applications that perform harmful or unwanted operations as a root/super user by approving a finite list of operations (i.e., a contract) that the applications may perform after receiving root access. Because the processor executing the contracts negotiator unit performs this evaluation before the application begins performing privileged operations, the processor executing the contracts enforcer unit may ensure that the application performs benign operations by checking the identity of the operations the application intends to perform instead of having to check the effects of each operation the application performs after receiving root access on the fly. Thus, the use of a contract may be a comparatively lightweight mechanism to avoid potential malicious behavior because operations that are permitted to execute have been pre-screened to ensure that they do not cause malicious behavior.

In block 702, the processor executing the contracts enforcer unit may receive an accepted contract for an application to be enforced. As described above, the accepted contract may include a pre-screened list of operations the application intends to perform as a root/super user. In response to receiving the accepted contract, the processor executing the contracts enforcer unit may identify the pending operation the application will next perform in block 706, such as by inspecting a queue of API calls, instructions, or other operations the application is about to perform.

In block 708, the processor executing the contracts enforcer unit may compare the pending operation with the set of operations included in the accepted contract to ensure that the operation has been pre-approved for execution by the contracts negotiator unit. To accomplish this, the processor executing the contracts enforcer unit may perform a simple table look up operation using the accepted contract. Based on the outcome of the comparison, the processor executing the contracts enforcer unit may determine whether the pending operations matches one of the set of operations included in the accepted contract in determination block 710 as only operations included in the accepted contract are allowed to execute. In an aspect, the processor executing the contracts enforcer unit may make the above determination just before the application attempts to execute the pending operation.

When the processor executing the contracts enforcer unit determines that the pending operation matches one of the set of operations in the accepted contract (i.e., determination block 710="Yes"), the processor executing the enforcer unit may optionally determine whether the pending operation will be performed in its expected order in optional determination block 712. In such an aspect, the processor executing the contracts enforcer unit may require that a pending operation be performed in the order in which it is listed in the accepted contract in addition to requiring that the pending operation be included in the accepted operation. By enforcing the order of performance, the processor executing the contracts enforcer unit may better protect the computing device against potential malicious behavior that may occur when operations in the accepted contract are performed out of order. For example, the processor executing the contracts negotiator unit may not have detected malicious behavior after simulating the execution of operations in a proposed contract in their listed order, but the application may repeat or execute operations in the proposed contract out of order to cause unwanted or harmful effects (e.g., repeating operations to drain battery life and/or slow other processes on the computing device).

In response to determining that the pending operation does not match one of the set of operations in the accepted contract (i.e., determination block 710="No") or in response to determining that the pending operation will not be performed in its expected order (i.e., optional determination block 712="No"), the processor executing the enforcer unit may optionally determining whether the pending operation is included in a pre-approved list of operations in optional determination block 714. Such a pre-approved list of operations may include operations that are known to be benign operations that the application may perform at any time without breaching the contract. In other words, the processor executing the contracts enforcer unit may implement a "white-list" of safe operations, thereby allowing the application to continue to execute even though it had omitted one or more applications in the white list from the proposed contract. In another aspect, the processor executing the contracts enforcer unit may instead implement a "zero-tolerance" approach in which an application is terminated for any deviation from the accepted contract.

When the processor executing the contracts enforcer unit determines that the pending operation is not included in the pre-approved list of operations (i.e., optional determination block 714="No"), the processor executing the actuator unit may prevent the application from executing, such as by blocking or terminating the application, in block 512 as described above with reference to FIG. 5. The process may be repeated when the processor executing the contracts negotiator receives another proposed contract from an application starting in block 502 described above with reference to FIG. 5.

In response to determining that the pending operation will be performed in its expected order (i.e., optional determination block 712="Yes") or in response to determining that the pending operation is included in a pre-approved list of operations (i.e., optional determination block 714="Yes"), the processor executing the contracts enforcer unit may enable the application to perform the pending operation in block 716. In performing the operations of block 716, the processor executing the contracts enforcer unit may take no further action and instead may allow the application to continue performing normally.

The processor executing the contracts enforcer unit may also determine whether to continue enforcing the accepted contract in determination block 718. In an aspect, the processor executing the contracts enforcer unit may not need to continue enforcing the accepted contract in various circumstances. For example, the processor executing the contracts enforcer unit may continue cross-checking the application's pending operations against those included in the accepted contract as described above until the application no longer has root access or until the application terminates. Thus, when the processor executing the contracts enforcer unit determines to continue enforcing the accepted contract (i.e., determination block 718="Yes"), the processor executing the enforcer unit may repeat the above operations starting by identifying the pending operation that the application will next perform in block 706. When the processor executing the contracts enforcer unit determines not to continue enforcing the accepted contract (i.e., determination block 718="No"), the process may be repeated when the processor executing the contracts negotiator receives another proposed contract from an application starting in block 502 of method 500 described above with reference to FIG. 5.

Figures 8A, 8B:
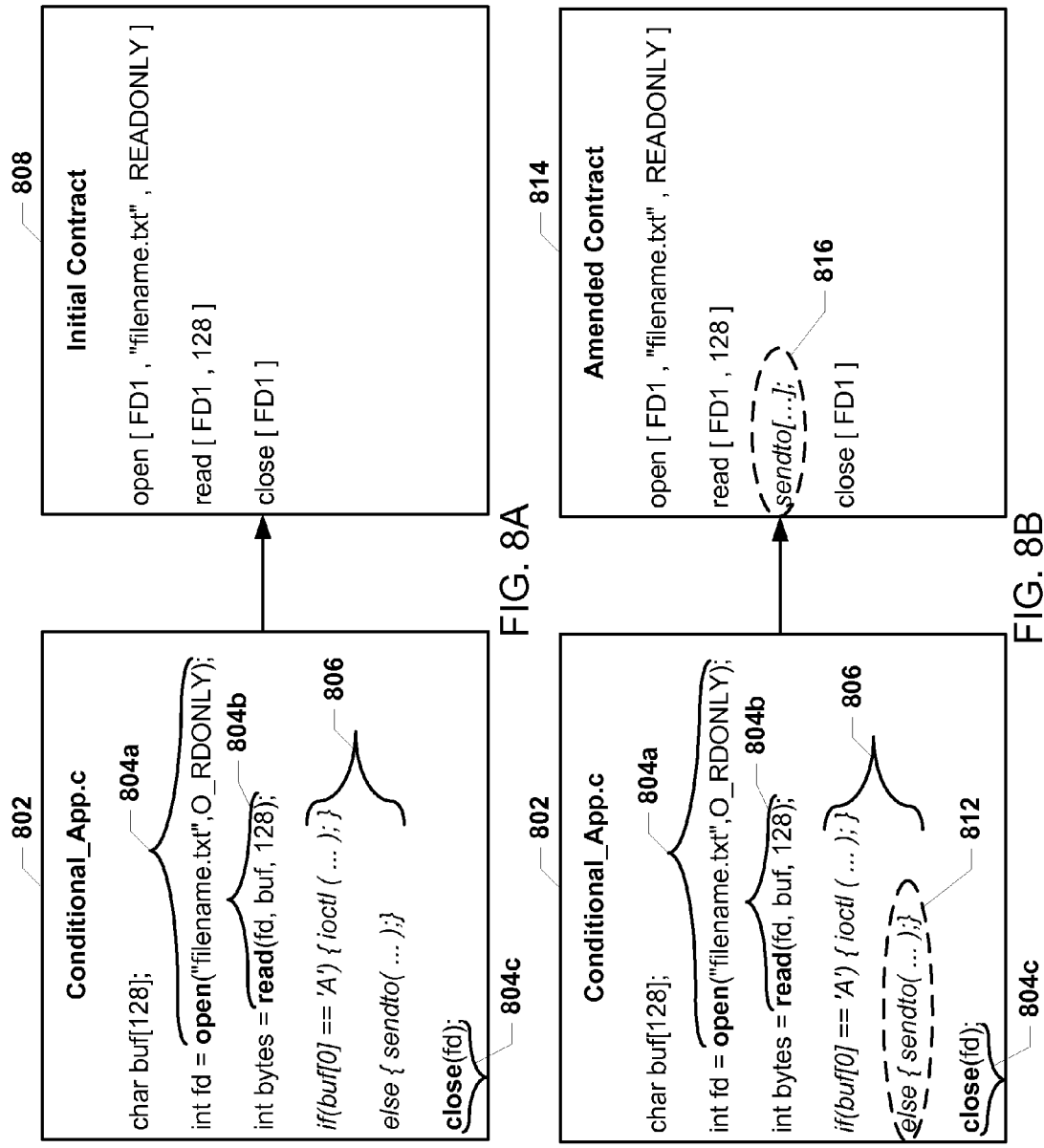
FIGS. 8A-8B are illustrations of an example initial contract and an example amended contract generated by an application according to an aspect.

FIGS. 8A and 8B illustrate example contracts 808, 814 generated by an application according to an aspect. Frequently, an application may include many conditional branches (e.g., if/else statements) that may make it impossible for the application to know at launch the operations that it will call with absolute certainty. While the application could create a contract that follows each conditional branch, such contracts may be extremely long and complicated and may require the contracts negotiator unit to spend considerable computational resources to follow each conditional branch when simulating the execution of the operations in the proposed contract. Thus, in order to avoid having to anticipate each conditional branch with length contracts (which may require a considerable amount of time, battery power, and/or processing resources), further aspects implement a mechanism as described below that enables an application to amend an initial/previously accepted contract to include operations in a particular conditional branch selected during runtime.

As illustrated in FIG. 8A, an application 802 (i.e., "Conditional_App.c") may include various operations include various operations for which the application intends to perform as a root/super user as described above with reference to FIGS. 4A and 4B. For example, the application 802 may require root access to perform system calls to open a file (i.e., an open operation 804a), read part of the file (i.e., a read operation 804b), and close the file (i.e., a close operation 804c).

Further, the application 802 may include a set of branching operations 806, and the application 802 may be unable to determine the particular operations in the set of branching operations 806 that will be executed until some later point during runtime. For example, as illustrated in FIG. 8A, the application 802 may perform either the "ioctl( . . . )" operation or the "sendto( . . . )" operation depending on the outcome of the determination operation "if(buf[0]=='A')." Because of the uncertainty in which operations in the set of branching operations 806 will be executed during runtime, the application 802 may generate an initial contract 808 that does not include every operation the application 802 may want or need to execute as a super/root user. For example, the initial contract 808 may only include the open operation 804a, the read operation 804b, and the close operation 804c—as well as the parameters and data associated with each of those operations 804a-804c—because the application 802 knows that it will perform those operations at launch.

After generating the initial contract 808, the application 802 may pass the initial contract 808 to the contracts negotiator unit, and the processor executing the negotiator unit may determine whether to accept or reject the initial contract 808 as described above with reference to FIG. 6. When the processor executing the contracts negotiator unit accepts the initial contract 808, the processor executing the contracts enforcer unit may enforce the initial contract 808 as described with reference to FIG. 7.

As illustrated in FIG. 8B, assuming that the initial contract 808 has been accepted and is currently being enforced, a processor executing the application 802 may have determined one or more operations in the set of branching operations 806 that the application 802 will perform (e.g., the send operation 812 in the else branch of the program). In response to resolving the identity of the one or more branching operations that will be executed, the processor executing the application 802 may generate an amended contract 814 that includes the operations in the initial contract 808 as well as the one or more branching operations that will be executed. Thus, the amended contract 814 illustrated in FIG. 8B may include entries for the operations 804a-804c included in the initial contract 808, as well as an entry 816 for the send operation 812. In an aspect, the amended contract 814 may include the updated execution order for the operations included in the amended contract 814. For example, the entry 816 for the send operation 812 may be placed between the entry for the read operation 804b and the entry for the close operation 804c because the application 802 intends to execute the send operation 812 will in between those two operations 804b, 804c. The processor executing the application 802 may then send the amended contract 814 to the contracts negotiator unit.

After receiving the amended contract 814, the processor executing the contracts negotiator unit may determine whether executing the operations in the amended contract 814 would cause malicious behavior (i.e., whether to accept the amended contract) as further described below with reference to FIG. 9. When the processor executing the contracts negotiator unit accepts the amended contract 814, the processor executing the contracts negotiator may send it to the contracts enforcer unit for enforcement. The processor executing the contracts enforcer unit may stop enforcing the initial contract 808 and begin enforcing the amended contract 814. In an aspect, the contracts enforcer unit may enforce the amended contract 814 as described above with reference to FIG. 7.

Figure 9:
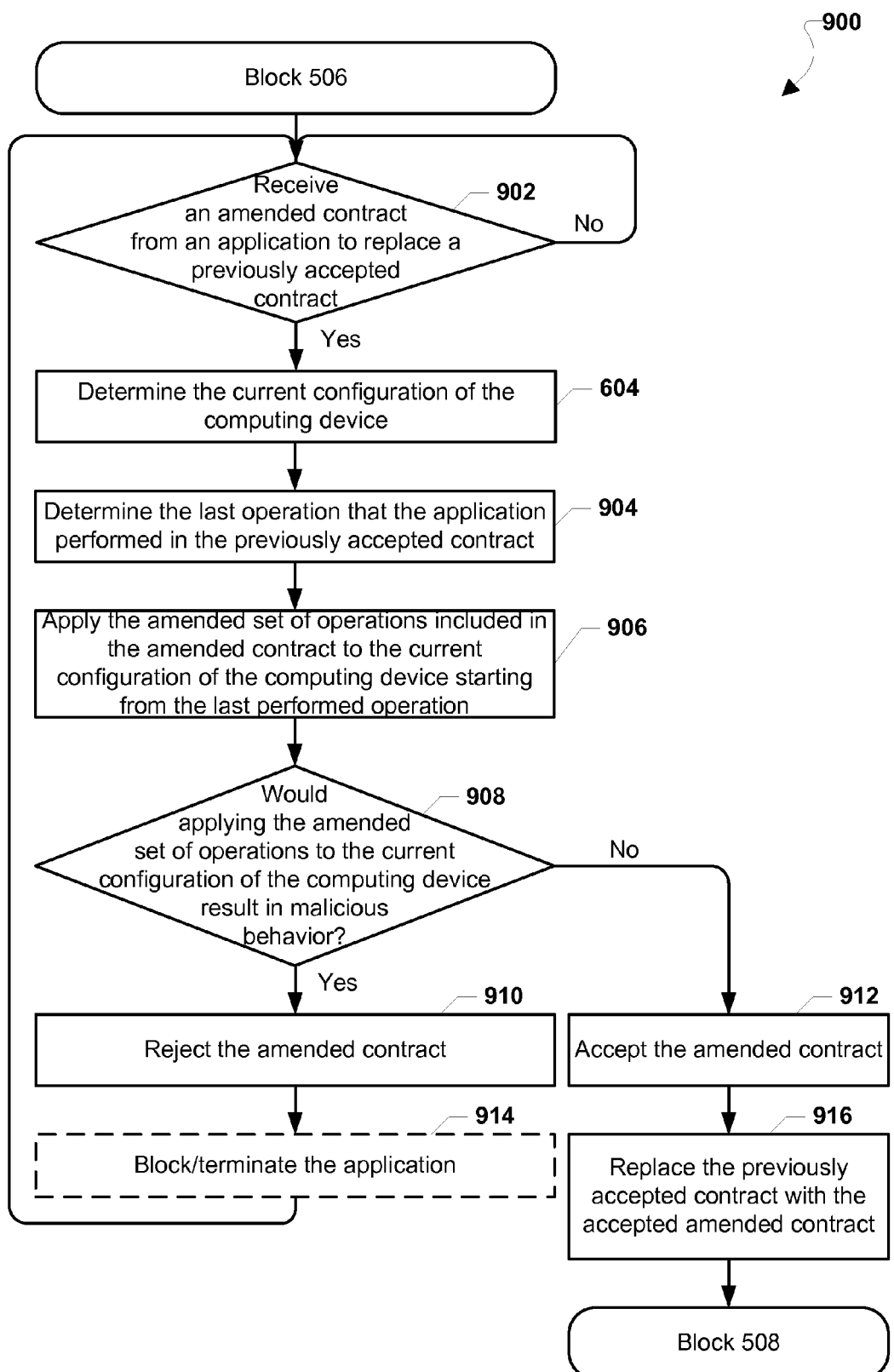
FIG. 9 is a process flow diagram illustrating an aspect method for determining whether to accept an amended contract.

FIG. 9 illustrates an aspect method 900 that may be implemented on a computing device processor for determining whether to amend a previously accepted contract. The operations of method 900 implement an aspect of the operations of method 500 described above with reference to FIG. 5, and the process may start after the contracts negotiator unit accepts a contract in block 506 of method 500.

As described above with reference to FIGS. 8A and 8B, an application may continually amend a previously accepted contract to include additional operations the application may want to perform as a root/super user rather than generating a single, extremely large and complicated contract that accounts for every execution scenario. To facilitate this more straightforward process, the processor executing the contracts negotiator unit may determine whether the amendments to a previously accepted contract will cause malicious behavior as described herein.

In determination block 902, the processor executing the contracts negotiator unit may determine whether it has received an amended contract from an application to replace a previously accepted contract. Because some applications may not have conditional branching (e.g., simple applications), not every application may attempt to amend its contract. When the processor executing the contracts negotiator unit determines that it has not received an amended contract (i.e., determination block 902="No"), the processor executing the negotiator unit may repeat the operations in determination block 902 until it recognizes that it has received an amended contract.

When the processor executing the contracts negotiator unit determines that it has received an amended contract (i.e., determination block 902=Yes"), the processor executing the negotiator unit may determine the current configuration of the computing device in block 604 as described above with reference to FIG. 6. In other words, the processor executing the contracts negotiator unit may obtain and utilize the computing device's current configuration rather than using the device's configuration at an earlier time, such as when the processor executing the negotiator unit accepted the application's original contract.

In block 904, the processor executing the contracts negotiator unit may determine the last operation that the application performed in the previously accepted contract. In an aspect, the operations included in a contract may be listed in the order in which the application will perform those operations. Thus, when the application submits an amended contract to the contracts negotiator unit for approval, the additional operations in the amended contract may occur after the last operation that the application has performed. Thus, the processor executing the contracts negotiator unit may need to determine the "starting point" in the amended contract to enable the negotiator unit to determine whether the operations in the amended contract will cause malicious behavior as further described below with reference to blocks 906 and 908. In performing the operations of block 904, the processor executing the contracts negotiator unit may reference a pointer or some other indication of the last operation the application performed, which the processor executing the contracts enforcer unit may maintain as a part of its enforcement operations.

In block 906, the processor executing the contracts negotiator unit may apply the amended set of operations include in the amended contact to the current configuration of the computing device starting from the last performed operation determined in block 904. In an aspect, the processor executing the contracts negotiator unit may simulate the execution of the operations in the amended contract and monitor how executing those operations would affect one or more behavior vectors that represent the computing device's current configuration as discussed above in 606 of method 600 described with reference to FIG. 6. In another aspect, because the processor executing the contracts negotiator unit is starting after the last performed operation of the previously accepted contract, the processor executing the negotiator unit may only simulate the execution of operations in the amended contract that are listed after the last performed operations.

The processor executing the contracts negotiator unit may then determine whether applying the amended set of operations to the current configuration of the computing device results in malicious behavior in determination block 908. As discussed above in relation to determination block 608 of method 600 described with reference to FIG. 6, after simulating the execution of each operation in the amended contract, the processor executing the contracts negotiator unit may classify the one or more behavior vectors representing the predicted future configurations of the computing device as benign or malicious, thereby enabling the contracts negotiator unit to determine whether executing the amended set of operations would cause malicious behavior at any point during their execution.

When the processor executing the contracts negotiator unit determines that applying the amended set of operations to the computing device's current configuration results in malicious behavior (i.e., determination block 908="Yes"), the processor executing the negotiator unit may reject the amended contract in block 910, thereby preventing the application from executing operations that are not also included in the previously accepted contract. In an aspect, the processor executing the application may continue executing operations in the previously accepted contract and the contracts enforcer unit may continue enforcing the previously accepted contract.

In an optional aspect, the processor executing the actuator unit may prevent the application from executing, such as by terminating or blocking the application, in optional block 914 in response to the contracts negotiator unit's rejection of the amended contract. In such an aspect, the processor executing the contracts negotiator unit may block the application from executing root commands or may cause the application to terminate whenever any malicious behavior is detected during the approval process—including while determining whether to accept an amended contract. In another aspect, the processor executing the contracts negotiator unit may repeat the above operations starting in determination block 902 by determining whether it has received another amended contract from an application.

When the processor executing the contracts negotiator unit determines that applying the amended set of operations to the computing device's current configuration would not result in malicious behavior (i.e., determination block 908="No"), the processor executing the negotiator unit may accept the amended contract in block 912. The processor executing the contracts negotiator unit may also update/replace the previously accepted contract with the accepted amended contract in block 916. In other words, the processor executing the contracts negotiator unit may signal the processor executing the contracts enforcer unit to stop enforcing the previously accepted contract and to begin enforcing the accepted amended contract. In another aspect, the processor executing the contracts enforcer unit may start enforcing the accepted amended contract from the point at which the processor executing the enforcer unit stopped enforcing the previously accepted contract (i.e., the enforcer unit may seamlessly transition to enforcing the amended contract without losing its place in the ordered list of operations). The processor executing the contracts enforcer unit may then begin enforcing the accepted amended contract in block 508 of method 500 described above with reference to FIG. 5.

Figure 10:
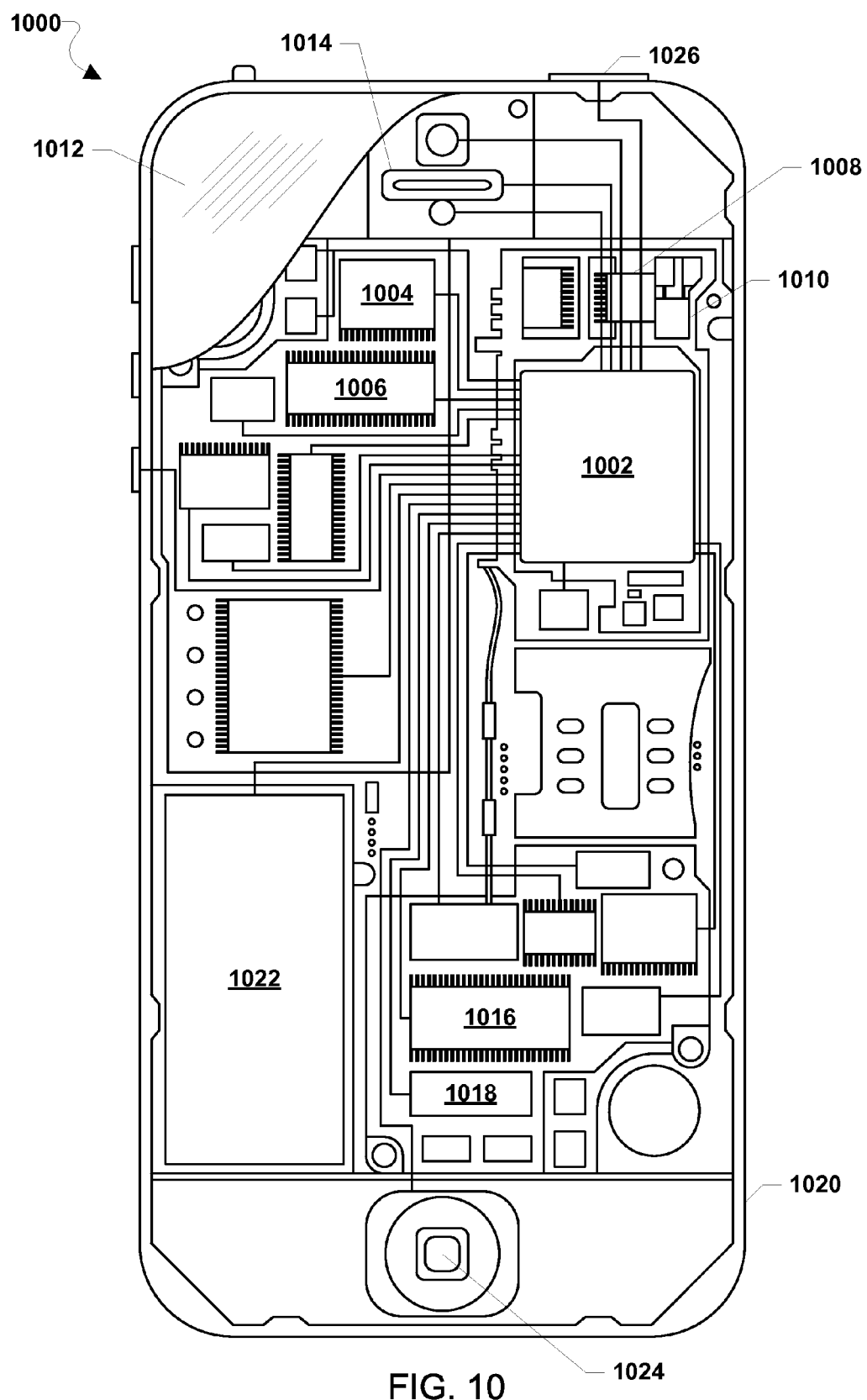
FIG. 10 is a component block diagram of a computing device suitable for use in an aspect.

The various aspects may be implemented in any of a variety of computing devices, an example of which is illustrated in FIG. 10. The computing device 1000 may include a processor 1002 coupled to a touchscreen controller 1004 and an internal memory 1006. The processor 1002 may be one or more multi-core integrated circuits designated for general or specific processing tasks. The internal memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The computing device 1000 may have one or more radio signal transceivers 1008 (e.g., Peanut, Bluetooth, Zigbee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The computing device 1000 may include a cellular network wireless modem chip 1016 that enables communication via a cellular network and is coupled to the processor.

The computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The computing device 1000 may also include speakers 1014 for providing audio outputs. The computing device 1000 may also include a housing 1020, constructed of a plastic, metal, or a combination of materials, for containing all or some of the components discussed herein. The computing device 1000 may include a power source 1022 coupled to the processor 1002, such as a disposable or rechargeable battery. The rechargeable battery may also be coupled to the peripheral device connection port to receive a charging current from a source external to the computing device 1000. The computing device 1000 may also include a physical button 1024 for receiving user inputs. The computing device 1000 may also include a power button 1026 for turning the computing device 1000 on and off.

Figure 11:
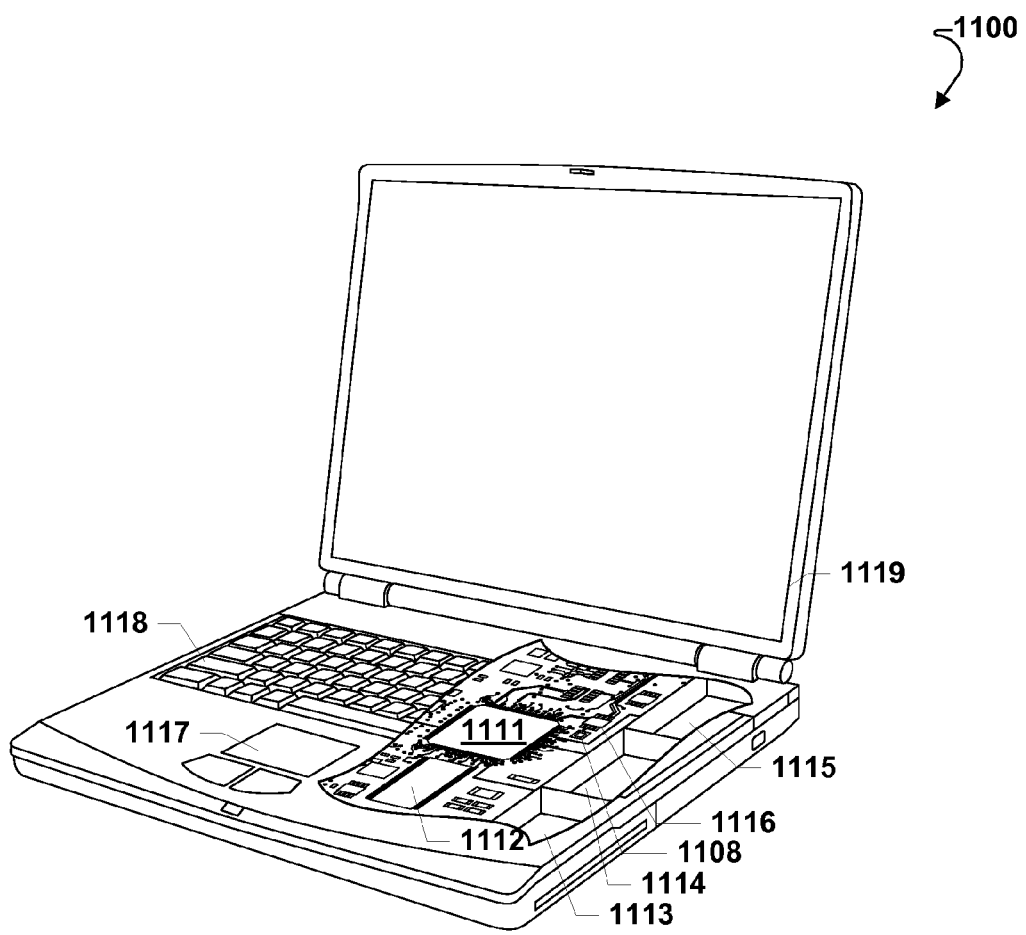
FIG. 11 is a component block diagram of another computing device suitable for use in an aspect.

The various aspects described above may also be implemented within a variety of mobile computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/units discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of pre-identifying a rootkit in a wireless computing device, comprising:
    receiving, by a processor of the wireless computing device, from an application a proposed contract before the application attempts to obtain root access, wherein the proposed contract comprises a set of operations listed in an order that the application intends to perform;
    determining, by the processor, whether any of the set of operations in the proposed contract require or involve root access;
    determining, by the processor, whether executing the set of operations that the application intends to perform in the order listed in the proposed contract would result in malicious behavior in response to determining that any of the set of operations in the proposed contract requires or involves root access;
    preventing, by the processor, the application from executing in response to determining that executing the set of operations in the order listed in the proposed contract would result in malicious behavior;
    accepting, by the processor, the proposed contract in response to determining that executing the set of operations in the order listed in the proposed contract would not result in malicious behavior; and
    enforcing, by the processor, the accepted contract by enabling execution of a set of pending operations that the application will perform next in an order that matches the set of operations in the order listed in the accepted contract and preventing execution of the set of pending operations not in the order listed in the accepted contract.

2. The method of claim 1, wherein:
    determining whether executing the set of operations in the order listed in the proposed contract would result in malicious behavior comprises:
        determining, by the processor, a current configuration of the wireless computing device;
        applying, by the processor, the set of operations in the order listed in the proposed contract to the current configuration of the wireless computing device; and
        determining, by the processor, whether applying the set of operations in the order listed in the proposed contract to the current configuration of the wireless computing device results in malicious behavior; and
    accepting, by the processor, the proposed contract in response to determining that executing the set of operations in the order listed in the proposed contract would not result in malicious behavior comprises accepting the proposed contract in response to determining that applying the set of operations in the order listed in the proposed contract to the current configuration of the wireless computing device does not result in malicious behavior.

3. The method of claim 1, further comprising:
    receiving, by the processor, an amended contract from the application to replace a previously accepted contract;
    determining, by the processor, a current configuration of the wireless computing device;
    determining, by the processor, an operation that the application last performed in the previously accepted contract;
    applying, by the processor, an amended set of operations in the order listed in the amended contract to the current configuration of the wireless computing device starting from the last performed operation;
    determining, by the processor, whether applying the amended set of operations in the order listed in the amended contract to the current configuration of the wireless computing device would result in malicious behavior;
    rejecting, by the processor, the amended contract and preventing the application from executing in response to determining that applying the amended set of operations in the order listed in the amended contract to the current configuration of the wireless computing device would result in malicious behavior;
    accepting, by the processor, the amended contract in response to determining that applying the amended set of operations in the order listed in the amended contract to the current configuration of the wireless computing device would not result in malicious behavior; and
    replacing, by the processor, the previously accepted contract with the accepted amended contract.

4. The method of claim 1, wherein enforcing the accepted contract by enabling execution of the set of pending operations that the application will perform next in an order that matches the set of operations in the order listed in the accepted contract and preventing execution of the set of pending operations not in the order listed in the accepted contract comprises:
    identifying, by the processor, a pending operation that the application will perform next;
    determining, by the processor, whether the pending operation matches one of the set of operations in the accepted contract;
    determining, by the processor, whether the application will perform the pending operation as one of the set of operations in the order listed in the accepted contract in response to determining that the pending operation matches one of the set of operations in the accepted contract;

enabling, by the processor, the application to perform the pending operation in response to determining that the application will perform the pending operation as one of the set of operations in the order listed in the accepted contract; and preventing, by the processor, the application from executing in response to determining that the application will perform the pending operation out of the order of operations listed in the accepted contract.

5. The method of claim 4, further comprising:
determining, by the processor, whether the pending operation is included in a pre-approved list of operations in response to determining that the pending operation does not match one of the set of operations in the accepted contract;

enabling, by the processor, the application to perform the pending operation in response to determining that the pending operation is included in the pre-approved list of operations; and preventing, by the processor, the application from executing in response to determining that the pending operation is not included in the pre-approved list of operations.

6. A wireless computing device, comprising:
a memory;
a processor coupled to the memory and configured with processor-executable instructions to perform operations comprising:
receiving from an application a proposed contract before the application attempts to obtain root access, wherein the proposed contract comprises a set of operations listed in an order that the application intends to perform;
determining whether any of the set of operations in the proposed contract require or involve root access;
determining whether executing the set of operations that the application intends to perform in the order listed in the proposed contract would result in malicious behavior in response to determining that any of the set of operations in the proposed contract requires or involves root access;
preventing the application from executing in response to determining that executing the set of operation in the order listed in the proposed contract would result in malicious behavior;
accepting the proposed contract in response to determining that executing the set of operations in the order listed in the proposed contract would not result in malicious behavior; and
enforcing the accepted contract by enabling execution of a set of pending operations that the application will perform next in an order that matches the set of operations in the order listed in the accepted contract and prevent execution of the set of pending operations not in the order listed in the accepted contract.

7. The wireless computing device of claim 6, wherein the processor is configured with processor-executable instructions to perform operations such that:
determining whether executing the set of operations in the proposed contract would result in malicious behavior comprises:
determining a current configuration of the wireless computing device;
applying the set of operations in the order listed in the proposed contract to the current configuration of the wireless computing device; and
determining whether applying the set of operations in the order listed in the proposed contract to the current configuration of the wireless computing device results in malicious behavior; and
accepting the proposed contract in response to determining that executing the set of operations in the order listed in the proposed contract would not result in malicious behavior comprises accepting the proposed contract in response to determining that applying the set of operations in the order listed in the proposed contract to the current configuration of the wireless computing device does not result in malicious behavior.

8. The wireless computing device of claim 6, wherein the processor is configured with processor-executable instructions to perform operations further comprising:
receiving an amended contract from the application to replace a previously accepted contract;
determining a current configuration of the wireless computing device;
determining an operation that the application last performed in the previously accepted contract;
applying an amended set of operations in the order listed in the amended contract to the current configuration of the wireless computing device starting from the last performed operation;
determining whether applying the amended set of operations in the order listed in the amended contract to the current configuration of the wireless computing device would result in malicious behavior;
rejecting the amended contract and preventing the application from executing in response to determining that applying the amended set of operations in the order listed in the amended contract to the current configuration of the wireless computing device would result in malicious behavior;
accepting the amended contract in response to determining that applying the amended set of operations in the order listed in the amended contract to the current configuration of the wireless computing device would not result in malicious behavior; and
replacing the previously accepted contract with the accepted amended contract.

9. The wireless computing device of claim 6, wherein the processor is configured with processor-executable instructions to perform operations such that enforcing the accepted contract by enabling execution of the set of pending operations that the application will perform next in an order that matches the set of operations in the order listed in the accepted contract and preventing execution of the set of pending operations not in the order listed in the accepted contract comprises:
identifying a pending operation that the application will perform next;
determining whether the pending operation matches one of the set of operations in the accepted contract;
determining whether the application will perform the pending operation as one of the set of operations in the order listed in the accepted contract in response to determining that the pending operation matches one of the set of operations in the accepted contract;
enabling the application to perform the pending operation in response to determining that the application will perform the pending operation as one of the set of operations in the order listed in the accepted contract; and preventing the application from executing in response to determining that the application will perform the pending operation out of the order of operations listed in the accepted contract.

10. The wireless computing device of claim 9, wherein the processor is configured with processor-executable instructions to perform operations further comprising:
determining whether the pending operation is included in a pre-approved list of operations in response to determining that the pending operation does not match one of the set of operations in the accepted contract;
enabling the application to perform the pending operation in response to determining that the pending operation is included in the pre-approved list of operations; and
preventing the application from executing in response to determining that the pending operation is not included in the pre-approved list of operations.

11. A wireless computing device, comprising:
means for receiving from an application a proposed contract before the application attempts to obtain root access, wherein the proposed contract comprises a set of operations listed in an order that the application intends to perform;
means for determining whether any of the set of operations in the proposed contract require or involve root access;
means for determining whether executing the set of operations that the application intends to perform in the order listed in the proposed contract would result in malicious behavior in response to determining that any of the set of operations in the proposed contract requires or involves root access;
means for preventing the application from executing in response to determining that executing the set of operations in the order listed in the proposed contract would result in malicious behavior;
means for accepting the proposed contract in response to determining that executing the set of operations in the order listed in the proposed contract would not result in malicious behavior; and
means for enforcing the accepted contract by enabling execution of a set of pending operations that the application will perform next in an order that matches the set of operations in the order listed in the accepted contract and preventing execution of the set of pending operations not in the order listed in the accepted contract.

12. The wireless computing device of claim 11, wherein:
means for determining whether executing the set of operations in the order listed in the proposed contract would result in malicious behavior comprises:
means for determining a current configuration of the wireless computing device;
means for applying the set of operations in the order listed in the proposed contract to the current configuration of the wireless computing device; and
means for determining whether applying the set of operations in the order listed in the proposed contract to the current configuration of the wireless computing device results in malicious behavior; and
means for accepting the proposed contract in response to determining that executing the set of operations in the order listed in the proposed contract would not result in malicious behavior comprises means for accepting the proposed contract in response to determining that applying the set of operations in the order listed in the proposed contract to the current configuration of the wireless computing device does not result in malicious behavior.

13. The wireless computing device of claim 11, further comprising:
means for receiving an amended contract from the application to replace a previously accepted contract;
means for determining a current configuration of the wireless computing device;
means for determining an operation that the application last performed in the previously accepted contract;
means for applying an amended set of operations in the order listed in the amended contract to the current configuration of the wireless computing device starting from the last performed operation;
means for determining whether applying the amended set of operations in the order listed in the amended contract to the current configuration of the wireless computing device would result in malicious behavior;
means for rejecting the amended contract and preventing the application from executing in response to determining that applying the amended set of operations in the order listed in the amended contract to the current configuration of the wireless computing device would result in malicious behavior;
means for accepting the amended contract in response to determining that applying the amended set of operations in the order listed in the amended contract to the current configuration of the wireless computing device would not result in malicious behavior; and
means for replacing the previously accepted contract with the accepted amended contract.

14. The wireless computing device of claim 11, wherein means for enforcing the accepted contract by enabling execution of the set of pending operations that the application will perform next in an order that matches the set of operations in the order listed in the accepted contract and preventing execution of the set of pending operations not in the order listed in the accepted contract comprises:
means for identifying a pending operation that the application will perform next;
means for determining whether the pending operation matches one of the set of operations in the accepted contract;
means for determining whether the application will perform the pending operation as one of the set of operations in the order listed in the accepted contract in response to determining that the pending operation matches one of the set of operations in the accepted contract;
means for enabling the application to perform the pending operation in response to determining that the application will perform the pending operation as one of the set of operations in the order listed in the accepted contract; and
means for preventing the application from executing in response to determining that the application will perform the pending operation out of the order of operations listed in the accepted contract.

15. The wireless computing device of claim 14, further comprising:
means for determining whether the pending operation is included in a pre-approved list of operations in response to determining that the pending operation does not match one of the set of operations in the accepted contract;
means for enabling the application to perform the pending operation in response to determining that the pending operation is included in the pre-approved list of operations; and means for preventing the application from executing in response to determining that the pending operation is not included in the pre-approved list of operations.

16. A non-transitory processor-readable storage medium having stored thereon processor-executable instructions, wherein the stored processor-executable instructions are configured to cause a processor of a wireless computing device to perform operations comprising:
receiving from an application a proposed contract before the application attempts to obtain root access, wherein the proposed contract comprises a set of operations listed in an order that the application intends to perform;
determining whether any of the set of operations in the proposed contract require or involve root access;
determining whether executing the set of operations that the application intends to perform in the order listed in the proposed contract would result in malicious behavior in response to determining that any of the set of operations in the proposed contract requires or involves root access;
preventing the application from executing in response to determining that executing the set of operations in the order listed in the proposed contract would result in malicious behavior;
accepting the proposed contract in response to determining that the set of operations in the order listed in the proposed contract would not result in malicious behavior; and
enforcing the accepted contract by enabling execution of a set of pending operations that the application will perform next in an order that matches the set of operations in the order listed in the accepted contract and preventing execution of the set of pending operations not in the order listed in the accepted contract.

17. The non-transitory processor-readable storage medium of claim 16, wherein the stored processor-executable instructions are configured to cause the wireless computing device processor to perform operations such that:
determining whether executing the set of operations in the order listed in the proposed contract would result in malicious behavior comprises:
determining a current configuration of the wireless computing device;
applying the set of operations in the order listed in the proposed contract to the current configuration of the wireless computing device; and
determining whether applying the set of operations in the order listed in the proposed contract to the current configuration of the wireless computing device results in malicious behavior; and
accepting the proposed contract in response to determining that executing the set of operations in the order listed in the proposed contract would not result in malicious behavior comprises accepting the proposed contract in response to determining that applying the set of operations in the order listed in the proposed contract to the current configuration of the wireless computing device does not result in malicious behavior.

18. The non-transitory processor-readable storage medium of claim 16, wherein the stored processor-executable instructions are configured to cause the wireless computing device processor to perform operations further comprising:
receiving an amended contract from the application to replace a previously accepted contract;
determining a current configuration of the wireless computing device;
determining an operation that the application last performed in the previously accepted contract;
applying an amended set of operations in the order listed in the amended contract to the current configuration of the wireless computing device starting from the last performed operation;
determining whether applying the amended set of operations in the order listed in the amended contract to the current configuration of the wireless computing device would result in malicious behavior;
rejecting the amended contract and preventing the application from executing in response to determining that applying the amended set of operations in the order listed in the amended contract to the current configuration of the wireless computing device would result in malicious behavior;
accepting the amended contract in response to determining that applying the amended set of operations in the order listed in the amended contract to the current configuration of the wireless computing device would not result in malicious behavior; and
replacing the previously accepted contract with the accepted amended contract.

19. The non-transitory processor-readable storage medium of claim 16, wherein the stored processor-executable instructions are configured to cause the wireless computing device processor to perform operations such that enforcing the accepted contract by enabling execution of the set of pending operations that the application will perform next in an order that matches the set of operations in the order listed in the accepted contract and preventing execution of the set of pending operations not in the order listed in the accepted contract comprises:
identifying a pending operation that the application will perform next;
determining whether the pending operation matches one of the set of operations in the accepted contract;
determining whether the application will perform the pending operation as one of the set of operations in the order listed in the accepted contract in response to determining that the pending operation matches one of the set of operations in the accepted contract;
enabling the application to perform the pending operation in response to determining that the application will perform the pending operation as one of the set of operations in the order listed in the accepted contract; and
preventing the application from executing in response to determining that the application will perform the pending operation out of the order of operations listed in the accepted contract.

20. The non-transitory processor-readable storage medium of claim 19, wherein the stored processor-executable instructions are configured to cause the wireless computing device processor to perform operations further comprising:
determining whether the pending operation is included in a pre-approved list of operations in response to determining that the pending operation does not match one of the set of operations in the accepted contract;
enabling the application to perform the pending operation in response to determining that the pending operation is included in the pre-approved list of operations; and
preventing the application from executing in response to determining that the pending operation is not included in the pre-approved list of operations.

* * * * *